US012516100B2

(12) United States Patent
Rezvani et al.

(10) Patent No.: US 12,516,100 B2
(45) Date of Patent: Jan. 6, 2026

(54) METHODS FOR PRODUCING REGULATORY B CELLS AND USES THEREOF

(71) Applicant: Board of Regents, The University of Texas System, Austin, TX (US)

(72) Inventors: Katy Rezvani, Houston, TX (US); Elizabeth Shpall, Houston, TX (US); Rafet Basar, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1122 days.

(21) Appl. No.: 17/602,922

(22) PCT Filed: Apr. 9, 2020

(86) PCT No.: PCT/US2020/027516
§ 371 (c)(1),
(2) Date: Oct. 11, 2021

(87) PCT Pub. No.: WO2020/210525
PCT Pub. Date: Oct. 15, 2020

(65) Prior Publication Data
US 2022/0175837 A1    Jun. 9, 2022

Related U.S. Application Data

(60) Provisional application No. 62/833,174, filed on Apr. 12, 2019.

(51) Int. Cl.
| | | |
|---|---|---|
| C07K 14/705 | (2006.01) | |
| A61K 40/13 | (2025.01) | |
| A61K 40/22 | (2025.01) | |
| A61K 40/24 | (2025.01) | |
| A61K 40/41 | (2025.01) | |
| A61K 45/06 | (2006.01) | |
| C12N 5/0781 | (2010.01) | |
| A61K 35/12 | (2015.01) | |

(52) U.S. Cl.
CPC ........ *C07K 14/70575* (2013.01); *A61K 40/13* (2025.01); *A61K 40/22* (2025.01); *A61K 40/24* (2025.01); *A61K 40/416* (2025.01); *A61K 40/418* (2025.01); *A61K 45/06* (2013.01); *C12N 5/0635* (2013.01); *A61K 2035/122* (2013.01); *A61K 2035/124* (2013.01)

(58) Field of Classification Search
CPC .............. C07K 14/70575; A61K 40/13; C12N 5/0635; C12N 2510/00; C12N 15/86; C12N 2501/2302; C12N 2501/52
See application file for complete search history.

(56) References Cited

U.S. PATENT DOCUMENTS

| | | |
|---|---|---|
| 5,962,406 A | 10/1999 | Armitage et al. |
| 6,264,951 B1 | 7/2001 | Armitage et al. |
| 2011/0059082 A1 | 3/2011 | Germer et al. |
| 2013/0071414 A1 | 3/2013 | Dotti |
| 2013/0143267 A1* | 6/2013 | Scholz ................... C07K 16/00 435/69.6 |
| 2013/0309692 A1 | 11/2013 | Yanagida et al. |
| 2014/0065118 A1 | 3/2014 | Tedder et al. |
| 2015/0110737 A1 | 4/2015 | Egwuagu et al. |
| 2016/0000789 A1 | 1/2016 | Shokat et al. |
| 2016/0137980 A1 | 5/2016 | Abbot et al. |
| 2016/0152951 A1 | 6/2016 | Arya et al. |
| 2016/0272999 A1 | 9/2016 | Duchateau et al. |

FOREIGN PATENT DOCUMENTS

| | | |
|---|---|---|
| JP | 2015-529084 | 10/2015 |
| WO | 00/06588 A1 | 2/2000 |
| WO | WO 2005/035570 | 4/2005 |
| WO | 2012/063875 A1 | 5/2012 |
| WO | 2013/109759 A1 | 7/2013 |
| WO | WO 2013/176915 A1 | 11/2013 |
| WO | WO 2014/039804 | 3/2014 |
| WO | WO 2014/186469 A2 | 11/2014 |
| WO | WO 2015/089338 | 6/2015 |
| WO | WO 2015/140268 A1 | 9/2015 |
| WO | 2016/019300 A1 | 2/2016 |
| WO | WO 2017/093969 | 6/2017 |
| WO | 2018/013897 A1 | 1/2018 |
| WO | WO 2018/237300 | 12/2018 |

OTHER PUBLICATIONS

Komai-Koma et al. IL-33 Activates B1 Cells and Exacerbates Contact Sensitivity. The Journal of Immunology, 2011, 186: 2584-2591. (Year: 2011).*
Griffin et al. Human B1 cells in umbilical cord and adult peripheral blood express the novel phenotype CD20+CD27+CD43+CD70-. J. Exp. Med. vol. 208 No. 1 67-80 (Year: 2011).*
Alivernini et al. MicroRNA-155 influences B-cell function through PU.1 in rheumatoid arthritis. Nat. Commun. 7:12970, p. 1-12 (Year: 2016).*
Ranganathan et al. Regulation of acute graft-versus-host disease by microRNA-155. Blood. 2012; 119(20):4786-4797 (Year: 2012).*
Office Communication issued in U.S. Appl. No. 16/624,254, dated Dec. 2, 2022.
Extended European Search Report issued in European Patent Application No. 20788556.7, dated Dec. 19, 2022.
Komlósi et al., "Human CD40 ligand-expressing type 3 innate lymphoid cells induce IL-10-producing immature transitional regulatory B cells," Journal of Allergy and Clinical Immunology, 142(1):178-194, 2018.
Mauri et al., "Immune Regulatory Function of B Cells," Annual Review of Immunology, 30(1):221-241, 2012.

(Continued)

*Primary Examiner* — Taeyoon Kim
(74) *Attorney, Agent, or Firm* — Norton Rose Fulbright US LLP

(57) ABSTRACT

Provided herein are methods for expanding populations of regulatory B cells comprising engineering a population of B cells to express CD40 ligand. Also provided herein are methods of treating immune disorders with the regulatory B cells.

5 Claims, 5 Drawing Sheets

Specification includes a Sequence Listing.

(56) References Cited

OTHER PUBLICATIONS

Rosser et al., "Regulatory B Cells: Origin, Phenotype, and Function," Immunity, 42(4):607-612, 2015.
Office Communication issued in Japanese Patent Application No. 2019-570969, dated Dec. 19, 2022.
Alsuliman et al., A robust, good manufacturing practice-compliant, clinical-scale procedure to generate regulatory T cells from patients with amyotrophic lateral sclerosis for adoptive cell therapy. Cytotherapy, Oct. 2016, vol. 18, No. 10, pp. 1312-1324.
Bocian et al: "Expanding Diversity and Common Goal of Regulatory T and B Cells. I: Origin, Phenotype, Mechanisms", Archivum Immunologiae Et Therapiae Experimentalis, vol. 65, No. 6, May 5, 2017 (May 5, 2017), pp. 501-520, Birkhaeuser Verlag AG, CH.
Chiba et al., "A Novel STAT6 Inhibitor AS1517499 Ameliorates Antigen-Induced Bronchial Hypercontractility in Mice", Am J Respir Cell Mot Biol, Nov. 1, 2009, vol. 41, No. 5, pp. 516-524.
Chopra et al., "Tumor necrosis factor receptor 2-dependent homeostasis of regulatory T cells as a player in TNF-Induced experimental metastasis", Carcinogenesis, Feb. 5, 2013, vol. 34, No. 6, pp. 1296-1303.
Go et al., "MicroRNA-21 plays an oncogenic role by targeting FOX01 and activating the PI3K/AKT pathway in diffuse large B-cell lymphoma", Oncotarget, Mar. 30, 2015, vol. 6, No. 17, pp. 15035-15049.
He et al., "The Roles of Regulatory B Cells in Cancer", Journal of Immunology Research, 2014, Article ID 215471, 7 pages, Hindawi Publishing Corporation.
Mauri et al: "Human regulatory B cells in health and disease: therapeutic potential", The Journal of Clinical Investigation, vol. 127, No. 3, Mar. 1, 2017 (Mar. 1, 2017), pp. 772-779.
Mauri et al: "The expanding family of regulatory B cells", International Immunology, vol. 27, No. 10, Jun. 12, 2015 (Jun. 12, 2015), pp. 479-486.
Sarvaria et al., "IL-10+ regulatory B cells are enriched in cord blood and may protect against cGVHD after cord blood transplantation", Blood, Sep. 8, 2016, vol. 128, No. 10, pp. 1346-1361.
Sattler et al., "IL-10-producing regulatory£ cells induced by IL-33 (BregIL-33) effectively attenuate mucosal Inflammatory responses in the gut", Journal of Autoimmunity, May 2014. vol. 50, pp. 107-122.
Tai X-G et al: "A Role for CD9 Molcules in T Cell Activation", The Journal of Experimental Medicine, vol. 184, No. 2, Aug. 1, 1996 (Aug. 1, 1996), pp. 753-758, Rockefeller University Press, US.
Taitano et al., "Differential Influence on Regulatory B Cells by TH2 Cytokines Affects Protection in Allergic Airway Disease", J Immunol, 2018; 201:1865-1874.
Brudno and Kochenderfer, "Toxicities of chimeric antigen receptor T cells: recognition and management," Blood, 127(26):3321-3330, 2016.
Anderson et al., "Expanded Nonhuman Primate Tregs Exhibit a Unique Gene Expression Signature and Potently Downregulate Alloimmune Responses," American Journal of Transplantation, 8:2252-2264, 2008.
Dong et al., "Regulation of glucocorticoid receptor expression: evidence for transcriptional and posttranslational mechanisms," Molecular Endocrinology, 2(12):1256-1264, 1988.
English translation of Office Communication issued in Chinese Patent Application No. 202080038115.3, dated Aug. 27, 2023.
Extended European Search Report issued in European Patent Application No. 23209126.4, dated Apr. 3, 2024.
Herold et al., "Glucocorticoids in cell apoptosis and function," Cellular and Molecular Life Sciences, 63(1):60-72, 2006.
Kellendonk et al., "Corticosteroid receptors in the brain: gene targeting studies," Brain Research Bulletin, 57(1):73-83, 2002. (Abstract Only).
Okret et al., "Regulation of glucocorticoid receptor expression," Biochimie, 73(1):51-59, 1991. (Abstract Only).
Ozcan, "Modeling of the mechanism of the glucocorticoid resistance using CRISPR/Cas9 mediated genome editing," Submitted to the Graduate School of Engineering and Natural Sciences in partial fulfillment of the requirements for the degree of Master of Science, Sabanci University, pp. 1-133, Jan. 2016. Retrieved from the Internet: https://acikbilim.yok.gov.tr/handle/20.500.12812/216080.
Wykes, "Why do B cells produce CD40 ligand?" Immunology & Cell Biology, 81:328-331, 2003.
Yanaba et al., "The Development and Function of Regulatory B Cells Expressing IL-10 (B10 cells) Requires Antigen Receptor Diversity and TLR Signals," J. Immunol., 182(12):7459-7472, 2009.
Office Communication issued in Chinese Patent Application No. 202080038115.3, dated Nov. 21, 2024. (English translation provided).

* cited by examiner

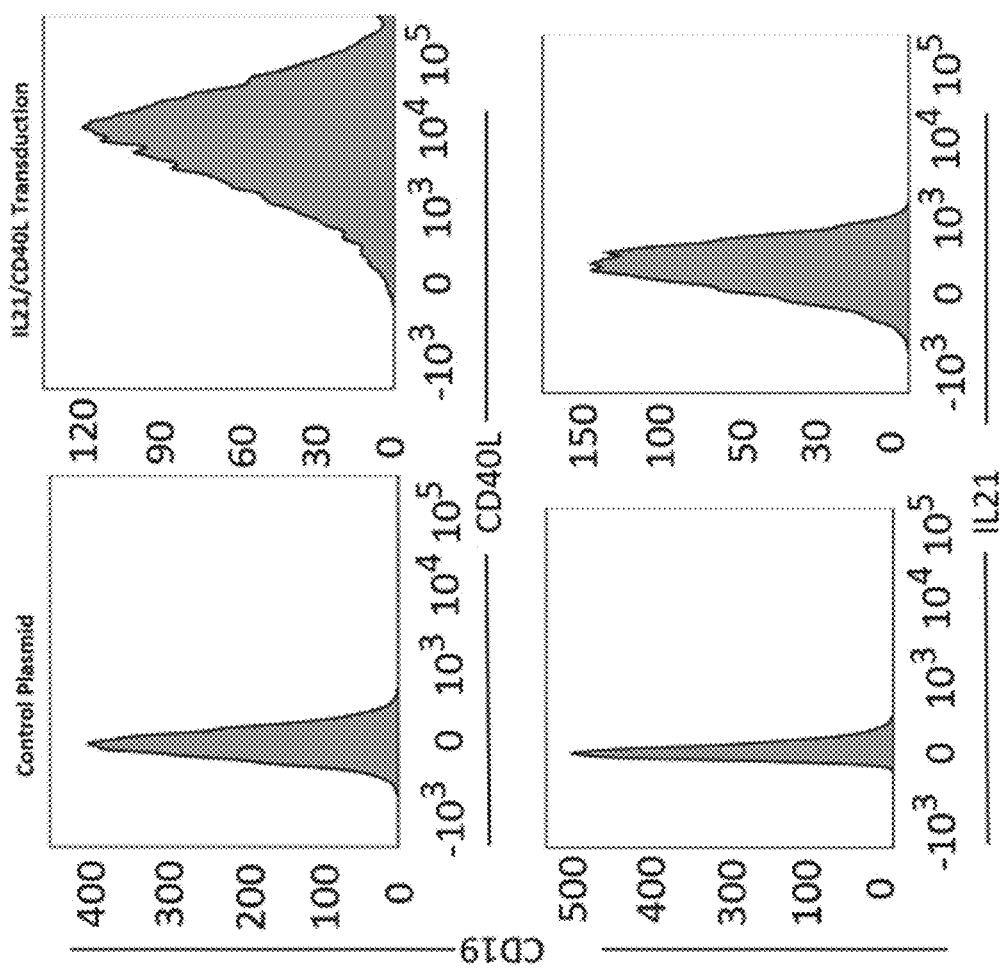
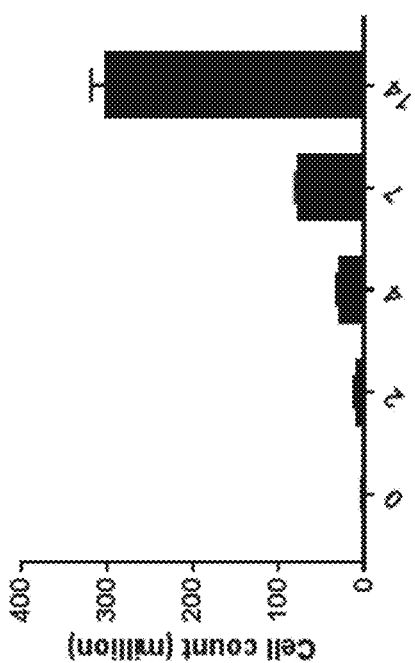
FIG. 1A
FIG. 1B

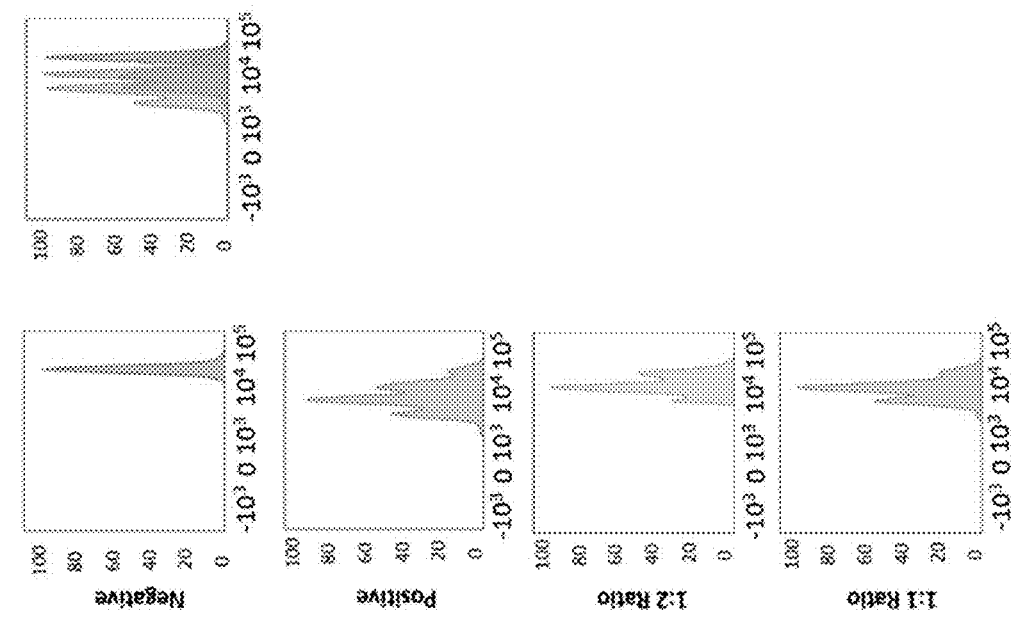
FIG. 2A
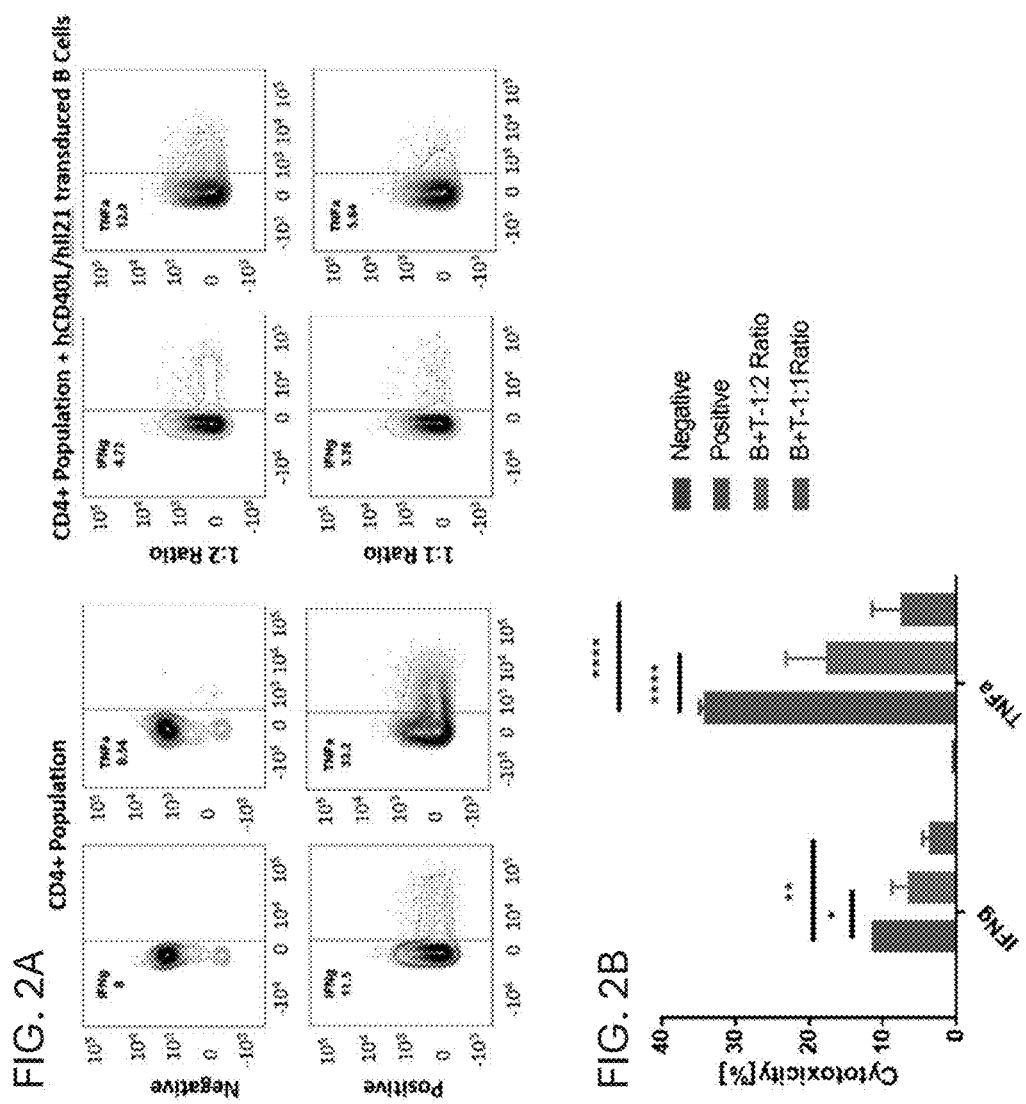
FIG. 2B
FIG. 2C

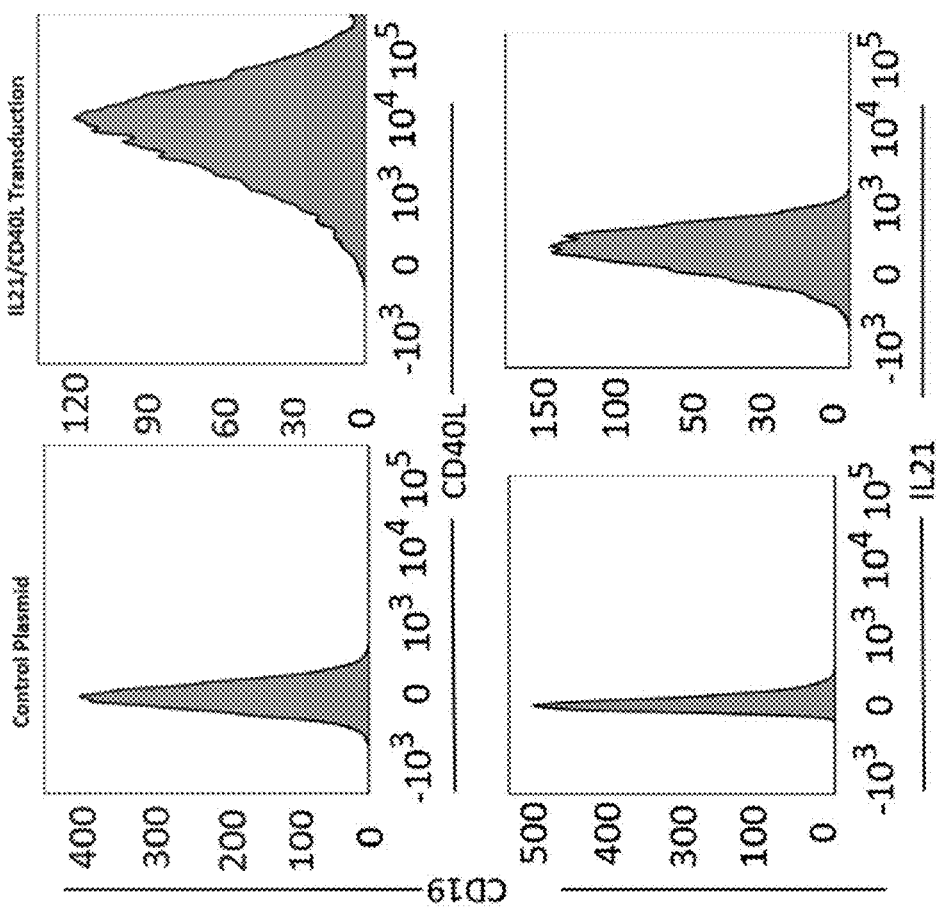
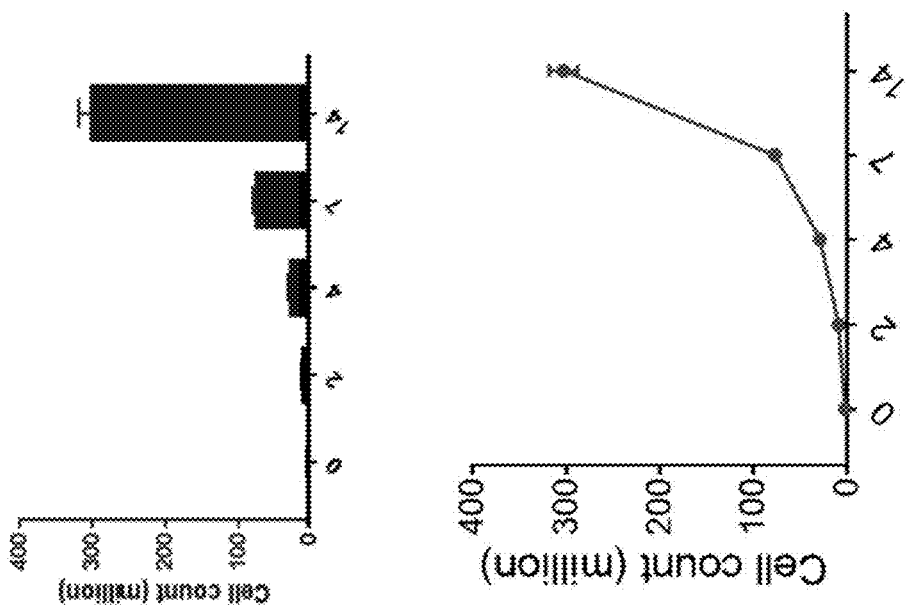
FIG. 4B
FIG. 4A

SEQUENCE LISTING

<160> NUMBER OF SEQ ID NOS: 8

<210> SEQ ID NO 1
<211> LENGTH: 856
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1

```
atggatgact ccacagaaag ggagcagtca cgccttactt cttgccttaa gaaaagagaa      60
gaaatgaaac tgaaggagtg tgtttccatc ctcccacgga aggaaagccc ctctgtccga     120
tcctccaaag acggaaagct gctggctgca accttgctgc tggcactgct gtcttgctgc     180
ctcacggtgg tgtctttcta ccaggtggcc gccctgcaag gggacctggc cagcctccgg     240
gcagagctgc agggccacca cgcggagaag ctgccagcag gagcaggagc ccccaaggcc     300
ggcctggagg aagctccagc tgtcaccgcg ggactgaaaa tctttgaacc accagctcca     360
ggagaaggca actccagtca gaacagcaga aataagcgtg ccgttcaggg tccagaagaa     420
acagtcactc aagactgctt gcaactgatt gcagacagtg aaacaccaac tatacaaaaa     480
ggatcttaca catttgttcc atggcttctc agctttaaaa ggggaagtgc cctagaagaa     540
aaagagaata aatattggt caaagaaact ggttactttt ttatatatgg tcaggtttta     600
tatactgata agacctacgc catgggacat ctaattcaga ggaagaaggt ccatgtcttt     660
ggggatgaat tgagtctggt gactttgttt cgatgtattc aaaatatgcc tgaaacacta     720
cccaataatt cctgctattc agctggcatt gcaaaactgg aagaaggaga tgaactccaa     780
cttgcaatac caagagaaaa tgcacaaata tcactggatg gagatgtcac attttttggt     840
gcattgaaac tgctgc                                                     856
```

<210> SEQ ID NO 2
<211> LENGTH: 787
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 2

```
atgatcgaaa catacaacca aacttctccc cgatctgcgg ccactggact gcccatcagc     60
atgaaaattt ttatgtattt acttactgtt tttcttatca cccagatgat tgggtcagca    120
```

-continued

```
cttttttgctg tgtatcttca tagaaggctg gacaagatag aagatgaaag gaatcttcat      180
gaagattttg tattcatgaa acgatacag agatgcaaca caggagaaag atccttatcc       240
ttactgaact gtgaggagat taaaagccag tttgaaggct ttgtgaagga tataatgtta      300
aacaaagagg aaacgaagaa agaaaacagc tttgaaatgc aaaaaggtga tcagaatcct     360
caaattgcgg cacatgtcat aagtgaggcc agcagtaaaa caacatctgt gttacagtgg     420
gctgaaaaag gatactacac catgagcaac aacttggtaa ccctggaaaa tgggaaacag    480
ctgaccgtta aaagacaagg actctattat atctatgccc aagtcacctt ctgttccaat     540
cgggaagctt cgagtcaagc tccatttata gccagcctct gcctaaagtc ccccggtaga     600
ttcgagagaa tcttactcag agctgcaaat acccacagtt ccgccaaacc ttgcgggcaa     660
caatccattc acttgggagg agtatttgaa ttgcaaccag gtgcttcggt gtttgtcaat     720
gtgactgatc caagccaagt gagccatggc actggcttca cgtcctttgg cttactcaaa    780
ctcggac                                                                787
```

<210> SEQ ID NO 3
<211> LENGTH: 512
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 3

```
gcatgagatc cagtcctggc aacatggaga ggattgtcat ttgtctgatg gtcattttct       60
tggggacact ggtccacaaa tcaagctccc aaggtcaaga tcgccacatg attaggatgc     120
gtcaacttat agatattgtt gatcagctga aaaattatgt gaatgacttg gtccctgaat      180
ttctgccagc tccagaagat gtagagacaa actgtgagtg gtcagctttt tcctgttttc      240
agaaggccca actaaagtca gcaaatacag gaaacaatga aaggataatc aatgtatcaa    300
ttaaaaagct gaagaggaaa ccaccttcca caaatgcagg gagaagacag aaacacagac    360
taacatgccc ttcatgtgat tcttatgaga aaaaccacc caaagaattc ctagaaaggt     420
tcaaatcact tctccaaaag atgattcatc agcatctgtc ctctagaaca cacggaagtg    480
aagattcctg agatgatcat caacaccagc tg                                   512
```

<210> SEQ ID NO 4
<211> LENGTH: 285
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 4

```
Met Asp Asp Ser Thr Glu Arg Glu Gln Ser Arg Leu Thr Ser Cys Leu
1               5                   10                  15

Lys Lys Arg Glu Glu Met Lys Leu Lys Glu Cys Val Ser Ile Leu Pro
            20                  25                  30

Arg Lys Glu Ser Pro Ser Val Arg Ser Ser Lys Asp Gly Lys Leu Leu
        35                  40                  45

Ala Ala Thr Leu Leu Leu Ala Leu Leu Ser Cys Cys Leu Thr Val Val
    50                  55                  60

Ser Phe Tyr Gln Val Ala Ala Leu Gln Gly Asp Leu Ala Ser Leu Arg
65                  70                  75                  80
```

```
Ala Glu Leu Gln Gly His His Ala Glu Lys Leu Pro Ala Gly Ala Gly
                85                  90                  95

Ala Pro Lys Ala Gly Leu Glu Glu Ala Pro Ala Val Thr Ala Gly Leu
            100                 105                 110

Lys Ile Phe Glu Pro Pro Ala Pro Gly Glu Gly Asn Ser Ser Gln Asn
        115                 120                 125

Ser Arg Asn Lys Arg Ala Val Gln Gly Pro Glu Glu Thr Val Thr Gln
    130                 135                 140

Asp Cys Leu Gln Leu Ile Ala Asp Ser Glu Thr Pro Thr Ile Gln Lys
145                 150                 155                 160

Gly Ser Tyr Thr Phe Val Pro Trp Leu Leu Ser Phe Lys Arg Gly Ser
                165                 170                 175

Ala Leu Glu Glu Lys Glu Asn Lys Ile Leu Val Lys Glu Thr Gly Tyr
            180                 185                 190

Phe Phe Ile Tyr Gly Gln Val Leu Tyr Thr Asp Lys Thr Tyr Ala Met
        195                 200                 205

Gly His Leu Ile Gln Arg Lys Lys Val His Val Phe Gly Asp Glu Leu
    210                 215                 220

Ser Leu Val Thr Leu Phe Arg Cys Ile Gln Asn Met Pro Glu Thr Leu
225                 230                 235                 240

Pro Asn Asn Ser Cys Tyr Ser Ala Gly Ile Ala Lys Leu Glu Glu Gly
                245                 250                 255

Asp Glu Leu Gln Leu Ala Ile Pro Arg Glu Asn Ala Gln Ile Ser Leu
            260                 265                 270

Asp Gly Asp Val Thr Phe Phe Gly Ala Leu Lys Leu Leu
        275                 280                 285

<210> SEQ ID NO 5
<211> LENGTH: 262
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 5

Leu Lys Met Ile Glu Thr Tyr Asn Gln Thr Ser Pro Arg Ser Ala Ala
1               5                   10                  15

Thr Gly Leu Pro Ile Ser Met Lys Ile Phe Met Tyr Leu Leu Thr Val
            20                  25                  30

Phe Leu Ile Thr Gln Met Ile Gly Ser Ala Leu Phe Ala Val Tyr Leu
        35                  40                  45

His Arg Arg Leu Asp Lys Ile Glu Asp Glu Arg Asn Leu His Glu Asp
    50                  55                  60

Phe Val Phe Met Lys Thr Ile Gln Arg Cys Asn Thr Gly Glu Arg Ser
65                  70                  75                  80

Leu Ser Leu Leu Asn Cys Glu Glu Ile Lys Ser Gln Phe Glu Gly Phe
                85                  90                  95

Val Lys Asp Ile Met Leu Asn Lys Glu Glu Thr Lys Lys Glu Asn Ser
            100                 105                 110

Phe Glu Met Gln Lys Gly Asp Gln Asn Pro Gln Ile Ala Ala His Val
        115                 120                 125

Ile Ser Glu Ala Ser Ser Lys Thr Thr Ser Val Leu Gln Trp Ala Glu
    130                 135                 140

Lys Gly Tyr Tyr Thr Met Ser Asn Asn Leu Val Thr Leu Glu Asn Gly
145                 150                 155                 160
```

```
Lys Gln Leu Thr Val Lys Arg Gln Gly Leu Tyr Tyr Ile Tyr Ala Gln
                165                 170                 175

Val Thr Phe Cys Ser Asn Arg Glu Ala Ser Ser Gln Ala Pro Phe Ile
            180                 185                 190

Ala Ser Leu Cys Leu Lys Ser Pro Gly Arg Phe Glu Arg Ile Leu Leu
        195                 200                 205

Arg Ala Ala Asn Thr His Ser Ser Ala Lys Pro Cys Gly Gln Gln Ser
    210                 215                 220

Ile His Leu Gly Gly Val Phe Glu Leu Gln Pro Gly Ala Ser Val Phe
225                 230                 235                 240

Val Asn Val Thr Asp Pro Ser Gln Val Ser His Gly Thr Gly Phe Thr
                245                 250                 255

Ser Phe Gly Leu Leu Lys
            260

<210> SEQ ID NO 6
<211> LENGTH: 163
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 6

Arg Met Arg Ser Ser Pro Gly Asn Met Glu Arg Ile Val Ile Cys Leu
1               5                   10                  15

Met Val Ile Phe Leu Gly Thr Leu Val His Lys Ser Ser Ser Gln Gly
            20                  25                  30

Gln Asp Arg His Met Ile Arg Met Arg Gln Leu Ile Asp Ile Val Asp
        35                  40                  45

Gln Leu Lys Asn Tyr Val Asn Asp Leu Val Pro Glu Phe Leu Pro Ala
    50                  55                  60

Pro Glu Asp Val Glu Thr Asn Cys Glu Trp Ser Ala Phe Ser Cys Phe
65                  70                  75                  80

Gln Lys Ala Gln Leu Lys Ser Ala Asn Thr Gly Asn Asn Glu Arg Ile
                85                  90                  95

Ile Asn Val Ser Ile Lys Lys Leu Lys Arg Lys Pro Pro Ser Thr Asn
            100                 105                 110

Ala Gly Arg Arg Gln Lys His Arg Leu Thr Cys Pro Ser Cys Asp Ser
        115                 120                 125

Tyr Glu Lys Lys Pro Pro Lys Glu Phe Leu Glu Arg Phe Lys Ser Leu
    130                 135                 140

Leu Gln Lys Met Ile His Gln His Leu Ser Ser Arg Thr His Gly Ser
145                 150                 155                 160

Glu Asp Ser

<210> SEQ ID NO 7
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
tccatgacgt tcctgatgct                                            20
```

```
<210> SEQ ID NO 8
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
tcgtcgtttt gtcgttttgt cgtt                                              24
```

METHODS FOR PRODUCING REGULATORY B CELLS AND USES THEREOF

This application is a national phase application under 35 U.S.C. § 371 that claims priority to International Application No. PCT/US2020/027516 filed Apr. 9, 2020, which claims priority to U.S. Provisional Patent Application Ser. No. 62/833,174, filed Apr. 12, 2019, both of which is are incorporated by reference herein in its their entirety.

INCORPORATION OF SEQUENCE LISTING

The instant application contains a Sequence Listing which has been submitted electronically in ASCII format and is hereby incorporated by reference in its entirety. Said ASCII copy, created on Oct. 11, 2021, is named SL_MDAC_P1178US.txt and is 10,767 bytes in size.

BACKGROUND

1. Field

The present invention relates generally to the fields of medicine and immunology. More particularly, it concerns regulatory B cell production and uses thereof.

2. Description of Related Art

Regulatory B cells (Bregs) can suppress immune responses and play an important role against autoimmune diseases and provide transplantation tolerance. As peripheral blood only comprises a small percentage of these suppressive immune cells, ex vivo methods of expansion are used to generate sufficient numbers of the suppressive cells for in vivo treatment or prevention of immune-associated diseases. Current protocols for expansion of Bregs include BCR ligation and CD40 ligand (Taitano et al., 2016).

However, immune therapies, such as for inflammatory conditions, generally require a large number of cells and, thus, it is vital to optimize the methods of inducing in vitro B cell proliferation in order to maximize the number of Bregs produced and minimize the time required to produce the suppressive cells in sufficient numbers. Therefore, there is an unmet need for methods of efficient expansion methods to generate Bregs for use in the treatment of various immune diseases including autoimmunity, infection, cancer, and cGVHD.

SUMMARY

Accordingly, certain embodiments of the present disclosure provide methods and compositions concerning the expansion of Bregs as well as methods for the use of these suppressive Bregs cells in the treatment and/or prevention of any immune-mediated disease. In one embodiment, there is provided an in vitro method for producing suppressive regulatory B cells (Bregs) comprising obtaining a population of B cells; engineering the B cells to express CD40 ligand (CD40L); and expanding the engineered B cells to produce the Bregs.

In some aspects, CD40L is soluble CD40L (sCD40L). In certain aspects, obtaining the population of B cells comprises isolating B cells from a blood sample and/or bone marrow. In some aspects, obtaining the population of B cells comprises differentiating B cells from $CD34^+$ hematopoietic stem cells and/or induced pluripotent stem cells (iPSCs). In certain aspects, isolating comprises performing antibody bead selection or fluorescence associated cell sorting (FACS). In some aspects, the blood sample is peripheral blood or cord blood. In particular aspects, the blood sample is cord blood (CB). In certain aspects, the cord blood is pooled from 2 or more individual cord blood units. In some aspects, the cord blood is pooled from 3, 4, or 5 individual cord blood units.

In certain aspects, the population of B cells are CB mononuclear cells (CBMCs). In some aspects, the population of B cells are $CD5^+CD1d^{hi}$ B cells. In particular aspects, the population of B cells are total B cells. In specific aspects, more than 90%, such as 91%, 92%, 93%, 94%, 95%, 96%, 97%, 98%, 99%, or 100%, of the population of B cells comprises B cells.

In some aspects, the method further comprises activating the B cells prior to engineering the B cells. In certain aspects, activating comprises culturing the B cells in the presence of IL-2, CpG oligodeoxynucleotides (ODNs), CD40L, anti-IgM, and/or anti-IgG. In some aspects, activating comprises culturing the B cells in the presence of CpG ODNs and CD40L.

In some aspects, activating comprises culturing the B cells in the presence of IL-2, CpG ODNs, anti-IgM, and anti-IgG. In certain aspects, the CpG ODNs are present at a concentration of 1-5 µg/mL, such as 1, 2, 3, or 3 µg/mL, particularly 3 µg/mL. In some aspects, the IL-2 is present at a concentration of 50-200 IU/mL, such as 50, 100, 150, or 200 IU/mL, particularly about 100 IU/mL. In certain aspects, the anti-IgM and anti-IgG are present at a concentration of 5-20 µg/mL, such as 5, 6, 7, 8, 9, 10, 11, 12, 13, 14, 15, or 20 µg/mL, such as g/mL. In particular aspects, activating is for 40-48 hours, such as about 41, 42, 43, 44, 45, 46, 47, or 48 hours.

In specific aspects, engineering comprises introducing an expression vector encoding for CD40L to said B cells. In some aspects, the vector is a viral vector. For example, the viral vector is a retroviral vector. In particular aspects, the retroviral vector is an MMLV-based retroviral vector. In some aspects, the expression vector further encodes for IL-21 and/or BAFF. In certain aspects, the expression vector further encodes for IL-21. In some aspects, the MMLV-based retroviral vector encodes for human CD40L and human IL-21 linked by a 2A cleavage peptide, CD40L and human BAFF linked by a 2A cleavage peptide, BAFF and human IL-21 linked by a 2A cleavage peptide, or CD40L, BAFF and human IL-21 linked by two 2A cleavage peptides. In specific aspects, the vector comprises SEQ ID NO:1, 2, or 3.

In some aspects, expanding is performed in the presence of IL-12 and/or IL-4. In specific aspects, expanding is performed in the presence of IL-12 and IL-4. In some aspects, the IL-12 is at a concentration of 10-100 IU/mL, such as 20, 30, 40, 50, 60, 70, 80, 90, or 100 IU/mL, particularly about 50 IU/mL. In certain aspects, the IL-4 is at a concentration of 1-10 ng/mL, such as 1, 2, 3, 4, 5, 6, 7, 8, 9, or 10 ng/mL, particularly 4 ng/mL. In specific aspects, expanding is for 12-16 days, such as 12, 13, 14, 15, or 16 days. In particular aspects, activating, engineering, or expanding further comprises culturing in the presence of one or more additional cytokines. In some aspects, the additional cytokine is IL-33. In some aspects, activating, engineering, or expanding further comprises the presence of one or more FOXO1 inhibitors, one or more mTOR inhibitors, and/or one or more STAT6 inhibitors. In particular aspects, the FOXO1 inhibitor is AS1842856 and/or AS1708727. In some aspects, the FOXO1 inhibitor is AS1842856. In specific aspects, the mTOR inhibitor is torkinib, rapamycin, everolimus, temsirolimus, deforolimus, BGT226, SF1126, BEZ235, Gedatolisib, and/or SF1101. In particular aspects, the mTOR inhibitor is torkinib. In some aspects, the STAT6 inhibitor is AS1517499 and/or leflunomide. In specific aspects, the STAT6 inhibitor is AS1517499.

In additional aspects, the method further comprises contacting the Bregs with anti-miR-155. In some aspects, the Bregs have the capacity to suppress the proliferation of $CD4^+$ T cells. In certain aspects, the Bregs are human Bregs.

In a further embodiment, there is provided a population of regulatory B cells produced according to the present methods (e.g., an in vitro method for producing suppressive regulatory B cells (Bregs) comprising obtaining a population of B cells; engineering the B cells to express CD40 ligand (CD40L); and expanding the engineered B cells to produce the Bregs). Another embodiment provides a pharmaceutical composition comprising the population of regulatory B cells of the embodiments and a pharmaceutically acceptable carrier.

In yet another embodiment, there is provided a method of treating an immune disorder in a subject comprising administering a therapeutically effective amount of the suppressive Bregs of the embodiments to the subject. In some aspects, the subject has been or is currently being administered at least one glucocorticoid therapy. In certain aspects, the immune disorder is inflammation, graft versus host disease, transplant rejection, and/or an autoimmune disorder. In particular aspects, the Bregs are allogeneic with respect to a recipient subject. In other aspects, the Bregs are autologous with respect to a recipient subject. In particular aspects, the subject is a human.

In some aspects, the immune disorder is graft versus host disease (GVHD). In specific aspects, the GVHD is chronic GVHD (cGVHD).

In certain aspects, the subject has been previously been administered a cord blood transplantation (CBT). In some aspects, the Bregs are administered concurrently with the CBT. In other aspects, the Bregs is administered prior to or after the CBT. The duration of time between successive administrations of Bregs and CBT may be of any suitable duration, such as 1-24 hours, 1-7 days, 1-4 weeks, 1-12 months, or longer, and any subrange therebetween.

In particular aspects, the immune disorder is transplant rejection, and the transplant is an organ transplant, bone marrow or other cell transplant, composite tissue transplant, and/or a skin graft. In some aspects, the immune disorder is multiple sclerosis, inflammatory bowel disease, rheumatoid arthritis, type I diabetes, systemic lupus erythrematosus, contact hypersensitivity, asthma, and/or Sjogren's syndrome.

In additional aspects, the method further comprises administering at least one of a second therapeutic agent. In some aspects, the at least a second therapeutic agent is a therapeutically effective amount of an immunomodulatory or an immunosuppressive agent. In particular aspects, the immunosuppressive agent is a calcineurin inhibitor, an mTOR inhibitor, an antibody, a chemotherapeutic agent irradiation, a chemokine, an interleukins or an inhibitor of a chemokine and/or an interleukin. In certain aspects, the Bregs and/or the at least a second therapeutic agent are administered intravenously, intraperitoneally, intratracheally, intratumorally, intramuscularly, endoscopically, intralesionally, percutaneously, subcutaneously, regionally, or by direct injection or perfusion.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The present disclosure may be better understood by reference to one or more of these drawings in combination with the detailed description of specific embodiments presented herein.

FIGS. 1A-1B: B cells were isolated from PBMCs using negative isolation kits (Miltenyi Biotec) and activated with CpG ODN 2006 (CpG) (3 µg/ml, HycultBiotech) and CD40L (200 ng/ml, adipogen) for 48 hours and then transduced with MMLV retrovirus (LTR-hCD40L-2A-hIL21-LTR) and further exogenous support with IL2 (50 iU/ml) and IL4 (4 ng/ml). (1A) Transduction efficiency after 48 hours was excellent (top right and bottom right panels). (1B) Absolute B cell expansion after 2 weeks of expansion.

FIGS. 2A-2C: Magnetically isolated $CD4^+$ T cells were plated in 96-well flat-bottom plates at $10^5$ cells/well and stimulated with or without anti-CD3/CD28 Dynabeads (positive and negative controls, respectively); $10^5$ hCD40L/hIL21-transduced B cells were added at 1:1 or 1:2 ratio; InvitroGen. $CD4^+$ T cells were stained with 2 µM carboxyfluorescein succinimidyl ester (CFSE) (eBioscience) prior to culture. (2A) B cells and CFSE-labelled $CD4^+$ T cells were cocultured for 48 hours. Phorbol myristate acetate (50 ng/ml)/ionomycin (500 ng/ml) (PMA/Iono) and brefeldin A (BFA) (10 µg/ml) (all from Sigma-Aldrich, St Louis, MO, USA) were added for the last 4 hr. Cells were harvested, and intracellularly stained with anti-IFN-γ (B27; BD), TNF-α (MAb11; invitrogen). CD4+ T cells cultured in the presence of hCD40L/hIL21-transduced B cells suppress IFN-γ and TNFα production by CD4 T cells at different T:B cell ratios; (A—top left and bottom left panels). (2B) Results for CD4+T-cell cytokine suppression in the presence of CD40L/hIL21-transduced B cells from 2 independent experiments. (2C) The proliferation of $CD4^+$ T cells was analyzed by calculating the division index. Culture in the presence of CD40L/hIL21-transduced B cells suppressed CD4+ T cell proliferation as assessed by CFSE dilution at different T:B cell ratios (bottom two panels).

FIGS. 4A-4B: B cells were isolated from PBMCs using negative isolation kits (Miltenyi Biotec) and activated with CpG ODN 2006 (CpG) (3 µg/ml, HycultBiotech) and CD40L (200 ng/ml, adipogen) for 48 hours and then transduced with viral supernatant that can overexpress CD40L and IL21 and further support with IL2 (50 Iu/ml) and IL4 (4 ng/ml). (4A) Transduction efficiency after 48 hours. (4B) Absolute B cell number by time.

DESCRIPTION OF ILLUSTRATIVE EMBODIMENTS

Figure 3:
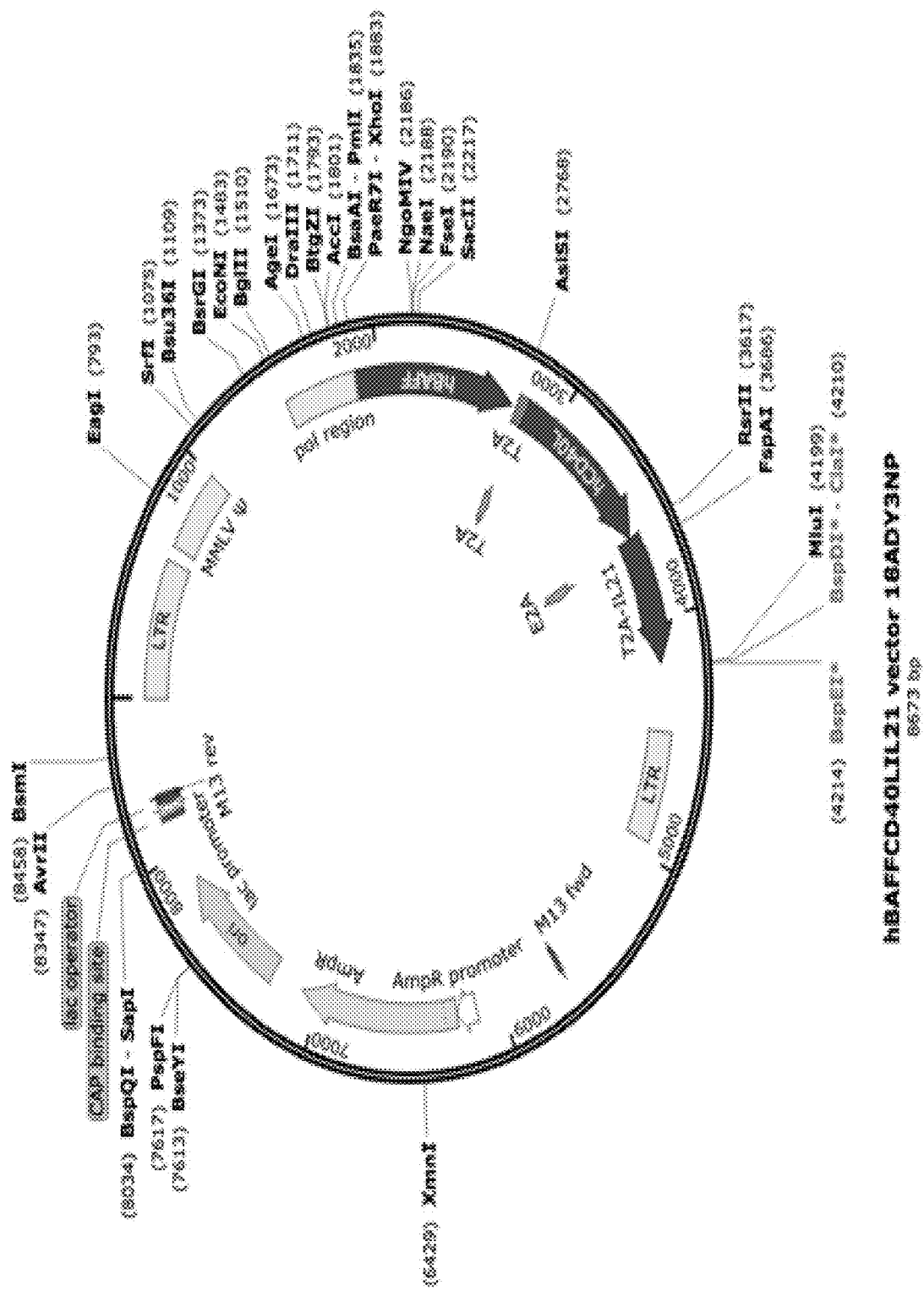
FIG. 3: Plasmid map for hBAFF-hCD40L-hIL21 to transduce B cells.

Certain embodiments of the present disclosure provide efficient methods of generating highly suppressive regulatory B cells (Bregs). Specifically, the Bregs produced by the present methods can be highly suppressive and of sufficient quantity for treatment of one or more inflammatory conditions. The present methods can comprise ex vivo transduction, activation and expansion of B cells, using an MMLV-based retroviral vector encoding for human IL21 and human CD40L (LTR-hCD40L-2A-hIL21-LTR). The present studies showed that the B cells transduced and expanded with this example of a construct have highly suppressive capabilities including suppressing IFNγ and TNFα production by CD4+ T cells Bregs may be activated by culturing B cells (e.g., total B cells or a purified CD5+CD1d$^{high}$ population of B cells) in the presence of IL-2, CpG oligodeoxynucleotides (ODNs), CD40L, anti-IgM, and/or anti-IgG. The starting population of B cells may be isolated from peripheral blood and/or cord blood. The initial activation culture may be for about 1-2, 1-3, or 2-3 days (including 1, 2, or 3 days), such as 40-48, 40-47, 40-46, 40-45, 40-44, 40-43, 40-42, 40-41, 41-48, 41-47, 41-46, 41-45, 41-44, 41-43, 41-42, 42-48, 42-47, 42-46, 42-45, 42-44, 42-43, 43-48, 43-47, 43-46, 43-45, 43-44, 44-48, 44-47, 44-46, 44-45, 45-48, 45-47, 45-46, 46-48, 46-47, or 47-48 hours, for example.

The B cells may then be engineered to express CD40L, and/or BAFF, and/or IL-12. The engineering may comprise an expression vector, such as a retroviral vector, particularly a MMLV-based retroviral vector. The B cells may then be expanded in the presence of IL-12 and/or IL-4. The expansion culture may further comprise one or more signaling inhibitors, such as one or more FOXO1 inhibitors, one or more mTOR inhibitors, and/or one or more STAT6 inhibitors. In addition, the inventors have found that exposure of B cells to anti-miR155 (e.g., pharmacologic inhibition or genetic manipulation) further increases their suppressive function. Thus, in some embodiments, the B cells or expanded Bregs are contacted with anti-miR155 to further enhance their suppressive activity.

The Bregs may be further engineered to express one or more chimeric antigen receptors (CAR). Further modifications may include a suicide switch that allows deletion of the cells to prevent any undue toxicity.

Accordingly, methods are also provided for harnessing this regulatory cell subset for the manipulation of the immune and inflammatory responses, and for the treatment of immune-related diseases, disorders and conditions including inflammatory and autoimmune diseases, as well as immunosuppression and cancer in humans and other mammals (dogs, cats, horses, etc.). For example, these stimulated Bregs can be used to treat autoimmune or alloimmune disorders, such as graft versus host disorder (GVHD). Thus, the present disclosure provides compositions of expanded Bregs that can be used for immunomodulation in a variety of immune-related disorders.

I. DEFINITIONS

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more. The terms "about", "substantially" and "approximately" mean, in general, the stated value plus or minus 5%.

A "regulatory B cell" (Breg) is a B cell that suppresses the immune response. Regulatory B cells can suppress T cell activation either directly or indirectly, and may also suppress antigen presenting cells, other innate immune cells, or other B cells. Regulatory B cells can be CD19+ or express a number of other B cell markers and/or belong to other B cell subsets. These cells can also secrete IL-10 that is enhanced by the stimulation methods provided herein.

A "B cell antigen receptor" or "BCR" refers to the B cell antigen receptor, which includes a membrane immunoglobulin antigen binding component, or a biologically active portion thereof (i.e, a portion capable of binding a ligand and/or capable of associating with a transducer component). The B cell receptor is generally composed of a surface bound IgM or IgD antibody associated with Ig-α and Ig-β heterodimers which are capable of signal transduction. The term "transmembrane domain of a B cell receptor" preferably refers to the transmembrane domain of the antibody part of the B cell receptor, i.e., the transmembrane domain of the IgM or IgD heavy chain. In some embodiments, the term "B cell receptor" or "BCR" preferably refers to a mature BCR and preferably excludes the pre-BCR which comprises a surrogate light chain.

A "CpG oligonucleotide" or "CpG oligodeoxynucleotides (ODN)" is an oligonucleotide which includes at least one unmethylated CpG dinucleotide. An oligonucleotide containing at least one unmethylated CpG dinucleotide is a nucleic acid molecule that contains an unmethylated cytosine-guanine dinucleotide sequence (i.e. "CpG DNA" or DNA containing a 5' cytosine followed by 3' guanosine and linked by a phosphate bond) and activates the immune system. The CpG oligonucleotides can be double-stranded or single-stranded. Generally, double-stranded molecules are more stable in vivo, while single-stranded molecules have increased immune activity.

The terms "nucleic acid" and "oligonucleotide" are used interchangeably to mean multiple nucleotides (i.e. molecules comprising a sugar (e.g. ribose or deoxyribose) linked to a phosphate group and to an exchangeable organic base, which is either a substituted pyrimidine (e.g. cytosine (C), thymine (T) or uracil (U)) or a substituted purine (e.g. adenine (A) or guanine (G)). As used herein, the terms refer to oligoribonucleotides as well as oligodeoxyribonucleotides. The terms shall also include polynucleosides (i.e. a polynucleotide minus the phosphate) and any other organic base containing polymer. Nucleic acid molecules can be obtained from existing nucleic acid sources (e.g. genomic or cDNA), but are preferably synthetic (e.g. produced by oligonucleotide synthesis).

An "immune disorder," "immune-related disorder," or "immune-mediated disorder" refers to a disorder in which the immune response plays a key role in the development or progression of the disease. Immune-mediated disorders include autoimmune disorders, allograft rejection, graft versus host disease and inflammatory and allergic conditions.

An "immune response" is a response of a cell of the immune system, such as a B cell, or a T cell, or innate immune cell to a stimulus. In one embodiment, the response is specific for a particular antigen (an "antigen-specific response").

An "autoimmune disease" refers to a disease in which the immune system produces an immune response (for example, a B-cell or a T-cell response) against an antigen that is part of the normal host (that is, an autoantigen), with consequent injury to tissues. An autoantigen may be derived from a host cell, or may be derived from a commensal organism such as the micro-organisms (known as commensal organisms) that normally colonize mucosal surfaces.

"Treating" or treatment of a disease or condition refers to executing a protocol, which may include administering one or more drugs (or any therapeutic composition) to an individual in need thereof, in an effort to alleviate signs or symptoms of the disease. Desirable effects of treatment include decreasing the rate of disease progression, ameliorating or palliating the disease state, and remission or improved prognosis. Alleviation can occur prior to signs or symptoms of the disease or condition appearing, as well as after their appearance. Thus, "treating" or "treatment" may include "preventing" or "prevention" of disease or undesirable condition. In addition, "treating" or "treatment" does not require complete alleviation of signs or symptoms, does not require a cure, and specifically includes protocols that have only a marginal effect on the patient.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the size of a tumor, a reduction in the invasiveness of a tumor, reduction in the growth rate of the cancer, or prevention of metastasis. Treatment of cancer may also refer to prolonging survival of a subject with cancer.

"Subject" and "patient" and "individual" refer to either a human or non-human, such as primates, mammals, and vertebrates. In particular embodiments, the subject is a human.

The term "antibody" herein is used in the broadest sense and specifically covers monoclonal antibodies (including full length monoclonal antibodies), polyclonal antibodies, multispecific antibodies (e.g., bispecific antibodies), and antibody fragments so long as they exhibit the desired biological activity.

The phrases "pharmaceutical or pharmacologically acceptable" refers to molecular entities and compositions that do not produce an adverse, allergic, or other untoward reaction when administered to an animal, such as a human, as appropriate. The preparation of a pharmaceutical composition comprising an antibody or additional active ingredient will be known to those of skill in the art in light of the present disclosure. Moreover, for animal (e.g., human) administration, it will be understood that preparations should meet sterility, pyrogenicity, general safety, and purity standards as required by FDA Office of Biological Standards.

As used herein, "pharmaceutically acceptable carrier" includes any and all aqueous solvents (e.g., water, alcoholic/aqueous solutions, saline solutions, parenteral vehicles, such as sodium chloride, Ringer's dextrose, etc.), non-aqueous solvents (e.g., propylene glycol, polyethylene glycol, vegetable oil, and injectable organic esters, such as ethyloleate), dispersion media, coatings, surfactants, antioxidants, preservatives (e.g., antibacterial or antifungal agents, anti-oxidants, chelating agents, and inert gases), isotonic agents, absorption delaying agents, salts, drugs, drug stabilizers, gels, binders, excipients, disintegration agents, lubricants, sweetening agents, flavoring agents, dyes, fluid and nutrient replenishers, such like materials and combinations thereof, as would be known to one of ordinary skill in the art. The pH and exact concentration of the various components in a pharmaceutical composition are adjusted according to well-known parameters.

An "isolated" biological component (such as a portion of hematological material, such as blood components) refers to a component that has been substantially separated or purified away from other biological components of the organism in which the component naturally occurs. An isolated cell is one which has been substantially separated or purified away from other biological components of the organism in which the cell naturally occurs.

As used herein, the term "substantially" is used to represent a composition comprising at least 80% of the desired component, more preferably 90% of the desired component, or most preferably 95% of the desired component. In some embodiments, the composition comprises at least 80%, 82%, 84%, 86%, 88%, 90%, 91%, 92%, 93%, 94%, 95%, 96%, 97%, or 98% of the desired component.

II. REGULATORY B CELLS

Some embodiments of the present disclosure concern the isolation and expansion of regulatory B cells (Breg). Accordingly, populations of highly suppressive Bregs are disclosed herein. The Bregs can be characterized by the capacity to inhibit the proliferation of effector T cells, such as $CD4^+$ T cells, inhibit the production of inflammatory cytokines (e.g., IFNγ and TNFα) by effector T cells, and to produce interleukin-10 (IL-10), as examples.

A. Isolation of Population of B Cells

The isolated population of B cells may be obtained from subjects, particularly human subjects. The B cells can be obtained from a subject of interest, such as a subject suspected of having a particular disease or condition, a subject suspected of having a predisposition to a particular disease or condition, or a subject who is undergoing therapy for a particular disease or condition. B cells can be collected from any location in which they reside in the subject including, but not limited to, blood, cord blood, spleen, thymus, lymph nodes, and/or bone marrow. The isolated B cells may be analyzed directly, or they can be stored until the assay is performed, such as by freezing.

In particular embodiments, the B cells are isolated from blood, such as peripheral blood, bone marrow and/or cord blood, and/or derived from stem cells and/or iPSCs. In some aspects, B cells isolated from cord blood have enhanced immunomodulation capacity, such as measured by CD4- or CD8-positive T cell suppression. In specific aspects, the B cells are isolated from pooled blood, particularly pooled cord blood, for enhanced immunomodulation capacity. The pooled blood may be from 2 or more sources, such as 3, 4, 5, 6, 7, 8, 9, 10 or more sources (e.g., donor subjects).

The population of B cells can be obtained from a subject in need of therapy or suffering from a disease associated with reduced regulatory B cell activity. Thus, the cells can be autologous to the subject in need of therapy. Alternatively, the population of B cells can be obtained from a donor, preferably a histocompatibility matched donor, and the cells can be allogeneic with respect to the subject in need of therapy.

When the population of regulatory B cells is obtained from a donor distinct from the subject, the donor is preferably allogeneic, provided the cells obtained are subject-compatible in that they can be introduced into the subject. Allogeneic donor cells may or may not be human-leukocyte-antigen (HLA)-compatible. To be rendered subject-compatible, allogeneic cells can be treated to reduce immunogenicity (Fast et al., 2004).

Methods for the isolation and quantitation of populations of cells are well known in the art, and the isolation and quantitation of regulatory B cells, such as CD19$^+$ cells can be accomplished by any means known to one of skill in the art. Magnetic beads directed against CD19 or fluorescence activated cell sorting (FACS), or other cell isolation methods, can be used to isolate cells that are CD19$^+$, and particularly that also produce IL-10. Regulatory B cells can also be isolated that express CD19 and are CD38$^{hi}$CD24$^{hi}$, IgM$^{hi}$IgD$^+$CD10$^+$CD27$^-$, CD38$^{int}$CD24$^{int}$ or IgM$^{int}$IgD$^+$CD10$^-$CD27$^-$ or that belong to any other B cell subpopulation. In particular aspects, the B cells are CD5$^+$CD1d$^{hi}$ B cells. In one embodiment, labeled antibodies specifically directed to one or more cell surface markers are used to identify and quantify regulatory B cells, such as CD19$^+$ cells. The antibodies can be conjugated to other compounds including, but not limited to, enzymes, magnetic beads, colloidal magnetic beads, haptens, fluorochromes, metal compounds, radioactive compounds and/or drugs. The enzymes that can be conjugated to the antibodies include, but are not limited to, alkaline phosphatase, peroxidase, urease and B-galactosidase. The fluorochromes that can be conjugated to the antibodies include, but are not limited to, fluorescein isothiocyanate, tetramethylrhodamine isothiocyanate, phycoerythrin, allophycocyanins and Texas Red.

Regulatory B cells can be enriched by selecting cells having the CD19$^+$ surface marker and separating using automated cell sorting such as fluorescence-activated cell sorting (FACS). To enhance enrichment, positive selection may be combined with negative selection; i.e., by removing cells having surface markers specific to non-B cells and/or those specific to non-regulatory B cells. Exemplary surface markers specific to non-regulatory B cells include CD3, CD4, CD7, CD8, CD15, CD16, CD34, CD56, CD57, CD64, CD94, CD116, CD134, CD157, CD163, CD208, F4/80, Gr-1, and/or TCR.

In some examples, regulatory B cells, such as CD19$^+$ cells, are isolated by contacting the cells with an appropriately labeled antibody to identify the cells of interest followed by a separation technique such as FACs or antibody-binding beads. However, other techniques of differing efficacy may be employed to purify and isolate desired populations of cells. The separation techniques employed should maximize the retention of viability of the fraction of the cells to be collected. The particular technique employed will, of course, depend upon the efficiency of separation, cytotoxicity of the method, the ease and speed of separation, and what equipment and/or technical skill is required.

Additional separation procedures may include magnetic separation, using antibody-coated magnetic beads, affinity chromatography, cytotoxic agents, either joined to a monoclonal antibody or used in conjunction with complement, and "panning," which utilizes a monoclonal antibody attached to a solid matrix, or another convenient technique. Antibodies attached to magnetic beads and other solid matrices, such as agarose beads, polystyrene beads, hollow fiber membranes and plastic Petri dishes, allow for direct separation. Cells that are bound by the antibody can be removed from the cell suspension by simply physically separating the solid support from the cell suspension. The exact conditions and duration of incubation of the cells with the solid phase-linked antibodies will depend upon several factors specific to the system employed. The selection of appropriate conditions, however, is well known in the art.

Unbound cells then can be eluted or washed away with physiologic buffer after sufficient time has been allowed for the cells expressing a marker of interest (for example, CD19$^+$) to bind to the solid-phase linked antibodies. The bound cells are then separated from the solid phase by any appropriate method, depending mainly upon the nature of the solid phase and the antibody employed, and quantified using methods well known in the art. In one specific, non-limiting example, bound cells separated from the solid phase are quantified by flow cytometry.

Regulatory B cells, such as CD19$^+$ B cells, can also be isolated by negatively selecting against cells that are not regulatory B cells. This can be accomplished by performing a lineage depletion, wherein cells are labeled with antibodies for particular lineages such as the T lineage, the macrophage/monocyte lineage, the dendritic cell lineage, the granulocyte lineages, the erythrocytes lineages, the megakaryocytes lineages, and the like. Cells labeled with one or more lineage specific antibodies can then be removed either by affinity column processing (where the lineage marker positive cells are retained on the column), by affinity magnetic beads or particles (where the lineage marker positive cells are attracted to the separating magnet), by "panning" (where the lineage marker positive cells remain attached to the secondary antibody coated surface), or by complement-mediated lysis (where the lineage marker positive cells are lysed in the presence of complement by virtue of the antibodies bound to their cell surface). Another lineage depletion strategy involves tetrameric complex formation. Cells are isolated using tetrameric anti-human antibody complexes (for example, complexes specific for multiple markers on multiple cell types that are not markers of regulatory B cells, and magnetic colloid in conjunction with STEMSTEP™ columns (Stem Cell Technologies, Vancouver, Canada). The cells can then optionally be subjected to centrifugation to separate cells having tetrameric complexes bound thereto from all other cells.

In a certain embodiment, the isolated B cells from a single donor or pooled donors can be stored for a future use. In this regard, the isolated B cell population can be cryopreserved. Cryopreservation is a process where cells or whole tissues are preserved by cooling to low sub-zero temperatures, such as 77 K or −196° C. in the presence of a cryoprotectant. Storage by cryopreservation includes, but is not limited to, storage in liquid nitrogen, storage in freezers maintained at a constant temperature of about 0° C., storage in freezers maintained at a constant temperature of about −20° C., storage in freezers maintained at a constant temperature of about −80° C., and storage in freezers maintained at a constant temperature of lower than about −80° C. In one aspect of this embodiment, the cells may be "flash-frozen," such as by using in ethanol/dry ice or in liquid nitrogen prior to storage. In another aspect of this embodiment, the cells can be preserved in medium comprising a cryoprotectant including, but not limited to dimethyl sulfoxide (DMSO), glycerol, ethylene glycol, propylene glycol, sucrose, and trehalose. Other methods of storing biological matter are well known to those of skill in the art, see for example U.S. Patent Publication No. 2007/0078113, incorporated by reference herein.

B. Activation and Expansion of Regulatory B Cells

The isolated populated of B cells may then be activated, engineered, and then expanded to increase the number of cells and/or to increase the suppressive capacity of the regulatory B cells. Activation and expansion of the regulatory B cell population can be achieved by contacting the population of regulatory B cells with stimulatory composition sufficient to cause an increase in the number of regulatory B cells. This may be accomplished by contacting the isolated CD19+ B cells with a mitogen, cytokine, growth factor, or antibody, such as an antibody that specifically binds to the B cell receptor or feeder cells. The regulatory B cells can be expanded at least 2-fold, 5-fold, 10-fold, such as at least 50-, 100-, 200-, 300-, 500-, 800-, 1000-, 10,000-, or 100,000-fold.

The present disclosure provides methods for the activation and expansion of the isolated B cells by treating the cells with one or more expansion agents to enhance their suppressive capacity. The expanded regulatory B cell population can include at least 5%, at least 10%, at least 20%, at least 30%, at least 40%, at least 50%, at least 60%, at least 90%, at least 91%, at least 92%, at least 93%, at least 94%, at least 95%, at least 99%, or 100% regulatory B cells that produce IL-10 or exert their suppressive function through other mechanisms.

The expansion agents may include one or more CD40 agonists, such as CD40 ligand (CD40L), particularly soluble CD40 and/or CpG nucleotides. Further expansion agents can include cytokines such as IL-4, IL-21, IL-33, or a combination thereof. The culture may also comprise IL-2.

In some aspects, the isolated population of B cells are first activated in the presence of IL-2, CpG oligodeoxynucleotides (ODNs), CD40L, anti-IgM, and/or anti-IgG, such as for about 1-3 days, specifically about 40-48 hours. The media may further comprise one or more signaling inhibitors. For example, the B cells may be cultured in the presence of IL-4, CpG, CD40L, and a signaling inhibitor, such as one or more FOXO1 inhibitors, one or more STAT6 inhibitors, and/or one or more mTOR inhibitors.

The activated B cells may then be engineered to express CD40L, and/or BAFF, and/or IL-21, particularly CD40L and IL-21. The cells may be genetically engineered to express one or more factors by methods known in the art, such as an expression vector encoding the one or more factors as described below. Exemplary vector sequences are provided below. The B cells may be engineered to express BAFF, and/or CD40L, and/or IL-21 using a vector having at least 80%, 85%, 90%, 95%, 99%, or 100% sequence identity to SEQ ID NOs:1-6.

hBAFF
(SEQ ID NO: 1)
ATGGATGACTCCACAGAAAGGGAGCAGTCACGCCTTACTTCTTGCCTTAA

GAAAAGAGAAGAAATGAAACTGAAGGAGTGTGTTTCCATCCTCCCACGGA

AGGAAAGCCCCTCTGTCCGATCCTCCAAAGACGGAAAGCTGCTGGCTGCA

ACCTTGCTGCTGGCACTGCTGTCTTGCTGCCTCACGGTGGTGTCTTTCTA

CCAGGTGGCCGCCCTGCAAGGGGACCTGGCCAGCCTCCGGGCAGAGCTGC

AGGGCCACCACGCGGAGAAGCTGCCAGCAGGAGCAGGAGCCCCCAAGGCC

GGCCTGGAGGAAGCTCCAGCTGTCACCGCGGGACTGAAAATCTTTGAACC

ACCAGCTCCAGGAGAAGGCAACTCCAGTCAGAACAGCAGAAATAAGCGTG

CCGTTCAGGGTCCAGAAGAAACAGTCACTCAAGACTGCTTGCAACTGATT

GCAGACAGTGAAACACCAACTATACAAAAAGGATCTTACACATTTGTTCC

ATGGCTTCTCAGCTTTAAAAGGGGAAGTGCCCTAGAAGAAAAAGAGAATA

AAATATTGGTCAAAGAAACTGGTTACTTTTTTATATATGGTCAGGTTTTA

TATACTGATAAGACCTACGCCATGGGACATCTAATTCAGAGGAAGAAGGT

CCATGTCTTTGGGGATGAATTGAGTCTGGTGACTTTGTTTCGATGTATTC

AAAATATGCCTGAAACACTACCCAATAATTCCTGCTATTCAGCTGGCATT

GCAAAACTGGAAGAAGGAGATGAACTCCAACTTGCAATACCAAGAGAAAA

TGCACAAATATCACTGGATGGAGATGTCACATTTTTTGGTGCATTGAAAC

TGCTGC hCD40L
(SEQ ID NO: 2)
ATGATCGAAACATACAACCAAACTTCTCCCCGATCTGCGGCCACTGGACT

GCCCATCAGCATGAAAATTTTTATGTATTTACTTACTGTTTTTCTTATCA

CCCAGATGATTGGGTCAGCACTTTTTGCTGTGTATCTTCATAGAAGGCTG

GACAAGATAGAAGATGAAAGGAATCTTCATGAAGATTTTGTATTCATGAA

AACGATACAGAGATGCAACACAGGAGAAAGATCCTTATCCTTACTGAACT

GTGAGGAGATTAAAAGCCAGTTTGAAGGCTTTGTGAAGGATATAATGTTA

AACAAAGAGGAAACGAAGAAAGAAAACAGCTTTGAAATGCAAAAAGGTGA

TCAGAATCCTCAAATTGCGGCACATGTCATAAGTGAGGCCAGCAGTAAAA

CAACATCTGTGTTACAGTGGGCTGAAAAAGGATACTACACCATGAGCAAC

AACTTGGTAACCCTGGAAAATGGGAAACAGCTGACCGTTAAAAGACAAGG

ACTCTATTATATCTATGCCCAAGTCACCTTCTGTTCCAATCGGGAAGCTT

CGAGTCAAGCTCCATTTATAGCCAGCCTCTGCCTAAAGTCCCCCGGTAGA

TTCGAGAGAATCTTACTCAGAGCTGCAAATACCCACAGTTCCGCCAAACC

TTGCGGGCAACAATCCATTCACTTGGGAGGAGTATTTGAATTGCAACCAG

GTGCTTCGGTGTTTGTCAATGTGACTGATCCAAGCCAAGTGAGCCATGGC

ACTGGCTTCACGTCCTTTGGCTTACTCAAACTCGGAC hIL21
(SEQ ID NO: 3)
GCATGAGATCCAGTCCTGGCAACATGGAGAGGATTGTCATTTGTCTGATG

GTCATTTTCTTGGGGACACTGGTCCACAAATCAAGCTCCCAAGGTCAAGA

TCGCCACATGATTAGGATGCGTCAACTTATAGATATTGTTGATCAGCTGA

AAAATTATGTGAATGACTTGGTCCCTGAATTTCTGCCAGCTCCAGAAGAT

-continued

```
GTAGAGACAAACTGTGAGTGGTCAGCTTTTTCCTGTTTTCAGAAGGCCCA

ACTAAAGTCAGCAAATACAGGAAACAATGAAAGGATAATCAATGTATCAA

TTAAAAAGCTGAAGAGGAAACCACCTTCCACAAATGCAGGGAGAAGACAG

AAACACAGACTAACATGCCCTTCATGTGATTCTTATGAGAAAAAACCACC

CAAAGAATTCCTAGAAAGGTTCAAATCACTTCTCCAAAAGATGATTCATC

AGCATCTGTCCTCTAGAACACACGGAAGTGAAGATTCCTGAGATGATCAT

CAACACCAGCTG hBAFF
                                      (SEQ ID NO: 4)
MDDSTEREQSRLTSCLKKREEMKLKECVSILPRKESPSVRSSKDGKLLAA

TLLLALLSCCLTVVSFYQVAALQGDLASLRAELQGHHAEKLPAGAGAPKA

GLEEAPAVTAGLKIFEPPAPGEGNSSQNSRNKRAVQGPEETVTQDCLQLI

ADSETPTIQKGSYTFVPWLLSFKRGSALEEKENKILVKETGYFFIYGQVL

YTDKTYAMGHLIQRKKVHVFGDELSLVTLFRCIQNMPETLPNNSCYSAGI

AKLEEGDELQLAIPRENAQISLDGDVTFFGALKLL hCD40L
                                      (SEQ ID NO: 5)
LKMIETYNQTSPRSAATGLPISMKIFMYLLTVFLITQMIGSALFAVYLHR

RLDKIEDERNLHEDFVFMKTIQRCNTGERSLSLLNCEEIKSQFEGFVKDI

MLNKEETKKENSFEMQKGDQNPQIAAHVISEASSKTTSVLQWAEKGYYTM

SNNLVTLENGKQLTVKRQGLYYIYAQVTFCSNREASSQAPFIASLCLKSP

GRFERILLRAANTHSSAKPCGQQSIHLGGVFELQPGASVFVNVTDPSQVS

HGTGFTSFGLLK hIL21
                                      (SEQ ID NO: 6)
RMRSSPGNMERIVICLMVIFLGTLVHKSSSQGQDRHMIRMRQLIDIVDQL

KNYVNDLVPEFLPAPEDVETNCEWSAFSCFQKAQLKSANTGNNERIINVS

IKKLKRKPPSTNAGRRQKHRLTCPSCDSYEKKPPKEFLERFKSLLQKMIH

QHLSSRTHGSEDS*
```

The engineered B cells may then be expanded in the presence of IL-12 and/or IL-14. The expansion culture may further comprise one or more additional cytokines, such as IL-33. The total expansion culture may be performed for about 8-15, 8-14, 8-13, 8-12, 8-11, 8-10, 8-9, 9-15, 9-14, 9-13, 9-12, 9-11, 9-10, 10-15, 10-14, 10-13, 10-12, 10-11, 11-15, 11-14, 11-13, 11-12, 12-15, 12-14, 12-13, 13-15, 13-14, of 14-15 days, particularly 10-14 days.

The suppressive function of the Bregs may be enhanced by the addition of anti-miR-155. The anti-miR-155 may be added to the expansion culture at any step of the process. However, in particular aspects, the anti-miR-155 is added to the Breg culture after expansion to further enhance the suppressive activity of the Bregs. For example, the anti-miR-155 may be added to the culture of Bregs at day 12-20 of expansion culture, such as day 13, 14, 15, or 16.

1. CD40 Ligand

In certain embodiments, the isolated B cells are cultured with a CD40 agonist, such as soluble CD40L, alone or in combination with other expansion agents. The term "CD40" refers to any, preferably naturally occurring, CD40 protein. CD40 is a transmembrane glycoprotein cell surface receptor that shares sequence homology with the tumor necrosis factor α (TNF-α) receptor family and was initially identified as a B cell surface molecule that induced B cell growth upon ligation with monoclonal antibodies.

Its ligand CD40L, also termed CD 154, is a 34-39 kDa type II integral membrane protein belonging to the TNF gene superfamily and is mainly expressed on activated T cells. Engagement of CD40 by its ligand leads to trimeric clustering of CD40 and the recruitment of adaptor proteins known as TNF receptor-associated factors (TRAFs) to the cytoplasmic tail of CD40. CD40L, also known as CD154, TNFSF5, TRAP, and gp39, is a member of the TNF superfamily which may trimerize to bind and activate CD40, as well as alpha IIb-beta3 integrin. CD40L is about 30-kDa, the full-length version has 261 amino acids of which the Extra Cellular Domain (ECD) is amino acids 45-261). It is a type II membrane glycoprotein. In some physiological contexts, CD40L is processed to yield a soluble form comprised of amino acids 113-261.

As used herein, the term "CD40-L" includes soluble CD40-L polypeptides lacking transmembrane and intracellular regions, mammalian homologs of human CD40-L, analogs of human or murine CD40-L or derivatives of human or murine CD40-L. A CD40-L analog, as referred to herein, is a polypeptide substantially homologous to a sequence of human or murine CD40-L but which has an amino acid sequence different from native sequence CD40-L (human or murine species) polypeptide because of one or a plurality of deletions, insertions or substitutions. Analogs of CD40-L can be synthesized from DNA constructs prepared by oligonucleotide synthesis and ligation or by site-specific mutagenesis techniques.

In some embodiments, one or more CD40 agonists, such as CD40 ligands and/or agonistic anti-CD40 antibodies, may be used in combination with one or more other expansion agents to enhance expansion of Bregs. For example, the CD40 agonist is an agonistic anti-CD40 antibody, or antigen-binding fragment thereof, including, but not limited to, at least a first scFv, Fv, Fab', Fab or F(ab')$_2$ antigen-binding region of an anti-CD40 antibody. In certain aspects, the CD40 agonist is a human, humanized or part-human chimeric anti-CD40 antibody or antigen-binding fragment thereof. In other aspects, the CD40 agonist is an anti-CD40 monoclonal antibody, including, but not limited to, the G28-5, mAb89, EA-5 or S2C6 monoclonal antibody, or an antigen-binding fragment thereof.

In particular embodiments, the CD40 agonist is soluble CD40L (sCD40L). Soluble CD40-L comprises an extracellular region of CD40-L or a fragment thereof. For example, soluble monomeric CD40L is described in U.S. Pat. No. 6,264,951 and variants are described in International Publication No. WO 2005/035570. CD40-L may also be obtained by mutations of nucleotide sequences coding for a CD40-L polypeptide. The B cells may be contacted with soluble CD40L at a concentration of about 10 to 500 ng/mL, such as about 20 to 200 ng/mL, such as about 30 to 150 ng/mL, such as about 50, 75, 80, 90, 95, 100, 110, or 120 ng/mL, particularly about 100 ng/mL. In some aspects, the B cells are cultured in the presence of CD40L at a concentration of 100-500 ng/mL, such as 150, 200, 250, 300, 350, 400, or 450 ng/mL.

2. Cytokines

The expansion of the isolated B cells to highly suppressive Bregs may also comprise contacting the B cells with one or more cytokines, such as, but not limited to, IL-4, IL-21, IL-33, IL-2, IL-7, IL-10, IL-21, IL-35, and BAFF. In some aspects, the B cells are first contacted with IL-4 and then cultured in the presence of IL-21. The cytokines may be present at a concentration of about 10 to 500 IU/mL, such as about 50 to 200 IU/mL, such as about 75 to 150 IU/mL, particularly about 100 IU/mL. In some aspects, the IL-4 is present at a concentration of about 0.1 to 10 ng/mL in the expansion culture, such as about 1 to 5 ng/mL, for example 2, 2.5, 3, 3.5, 4, or 4.5 ng/mL or any range derivable therein. In specific aspects, the IL-21 is present in the expansion culture at a concentration of about 10 to 250 ng/mL, such as 25-50, 50-75, 75-125, 125-150, 150-175, 175-225, or 225-250 ng/mL.

3. mTOR Inhibitor mTOR inhibitors are a class of drugs that inhibit the mechanistic target of rapamycin (mTOR), which is a serine/threonine-specific protein kinase that belongs to the family of phosphatidylinositol-3 kinase (PI3K) related kinases (PIKKs). Exemplary mTOR inhibitors that may be used in the present methods include, but are not limited to, rapamycin, everolimus, temsirolimus, deforolimus, BGT226, SF1126, BEZ235, Gedatolisib, and SF1101. In some aspects, the mTOR inhibitor is PP42 (also known as torkinib). The mTOR inhibitor may be present at a concentration of about 50 to 500 nM, such as 100 to 400 nm, particularly 150, 200, 250, 300, or 350 nM.

4. FOXO1 Inhibitor

Forkhead box protein 01 (FOXO1) also known as forkhead in rhabdomyosarcoma is a protein that in humans is encoded by the FOXO1 gene. FOXO1 is a transcription factor that plays important roles in regulation of gluconeogenesis and glycogenolysis by insulin signaling, and is also central to the decision for a preadipocyte to commit to adipogenesis. Exemplary FOXO1 inhibitors that may be used in the present methods include, but are not limited to, AS1842856 and AS1708727. The FOXO1 inhibitor may be present at a concentration of about 50 to 500 ng/mL, such as 100-200, 200-300, 300-400, or 400-500 ng/mL.

5. STAT6 Inhibitor

STAT6 inhibitors that may be used in the present methods include, but are not limited to, AS1517499 and leflunomide (ALX-430-095). Small molecule peptide mimetics that target the SH2 domain of STAT6 are disclosed in U.S. Pat. No. 6,426,331 and PCT Patent Publication No. WO2001/083517; both incorporated herein by reference. The STAT6 inhibitor may be present at a concentration of about 10 to 250 ng/mL, such as 20-50, 50-75, 75-100, 100-150, 150-200, or 200-250 ng/mL.

6. CpG Oligodeoxynucleotides

In certain embodiments, the B cells are expanded with CpG nucleotides. CpG oligodeoxynucleotides (ODN) are short single-stranded synthetic DNA molecules that contain a cytosine triphosphate deoxynucleotide followed by a guanine triphosphate deoxynucleotide which can act as immunostimulants. The CpG motifs are considered pathogen-associated molecular patterns (PAMPs) which are recognized by the pattern recognition receptor (PRR) Toll-like receptor 9 (TLR9) expressed on B cells and dendritic cells.

For facilitating uptake into cells, CpG containing oligonucleotides are preferably in the range of 8 to 100 bases in length. However, nucleic acids of any size greater than 8 nucleotides (even many kb long) are capable of inducing an immune response according to the invention if sufficient immunostimulatory motifs are present, since larger nucleic acids are degraded into oligonucleotides inside of cells. Preferably, the CpG oligonucleotide is in the range of between 8 and 100 and in some embodiments between 8 and 30 nucleotides in size. The CpG nucleic acid sequences may be as disclosed in International Publication Nos. WO2000/06588 and WO2000/06588 as well as U.S. Pat. No. 7,488,490; all incorporated herein by reference. The entire CpG oligonucleotide can be unmethylated or portions may be unmethylated but at least the C of the 5' CG 3' must be unmethylated. One exemplary CpG oligonucleotide represented by at least the formula: 5'$N_1X_1CGX_2N_2$3' wherein at least one nucleotide separates consecutive CpGs; $X_1$ is adenine, guanine, or thymine; $X_2$ is cytosine, adenine, or thymine; N is any nucleotide and $N_1$ and $N_2$ are nucleic acid sequences composed of from about 0-25 N's each. An exemplary CpG ODN has the sequence 5' TCCATGACGTTCCTGATGCT 3' (SEQ ID NO: 7). An additional exemplary CpG ODN is a 24-mer ODN 2006 that is able to modulate the immune response in both human and mice and has the sequence: 5'-tcgtcgttttgtcgttttgtcgtt-3' (SEQ ID NO: 8) where regular letters represent PS linkage and bold letters represent CpG dinucleotides.

The expansion culture may comprise one or more distinct CpG ODN sequences at a concentration of 0.1 to 10 μg/mL, such as around 0.5, 1, 1.5, 2, 2.5, 3, 3.5, 4, 4.5, 5, 4.5, 6, 7, 8, 9, or 10 μg/mL of CpG ODNs, such as 0.1-2, 1-3, 2-4, 3-6, 4-7, 5-8, 7-9, or 8-10 μg/mL of Cpg ODNs. In particular aspects, the B cells are treated with about 3 μg/mL of CpG ODNs.

C. Genetically Engineered B Cells

One of skill in the art would be well-equipped to construct a vector through standard recombinant techniques (see, for example, Sambrook et al., 2001 and Ausubel et al., 1996, both incorporated herein by reference) for the expression of the antigen receptors of the present disclosure. Vectors include but are not limited to, plasmids, cosmids, viruses (bacteriophage, animal viruses, and plant viruses), and artificial chromosomes (e.g., YACs), such as retroviral vectors (e.g. derived from Moloney murine leukemia virus vectors (MoMLV), MSCV, SFFV, MPSV, SNV etc), lentiviral vectors (e.g. derived from HIV-1, HIV-2, SIV, BIV, FIV etc.), adenoviral (Ad) vectors including replication competent, replication deficient and gutless forms thereof, adeno-associated viral (AAV) vectors, simian virus 40 (SV-40) vectors, bovine papilloma virus vectors, Epstein-Barr virus vectors, herpes virus vectors, vaccinia virus vectors, Harvey murine sarcoma virus vectors, murine mammary tumor virus vectors, Rous sarcoma virus vectors, parvovirus vectors, polio virus vectors, vesicular stomatitis virus vectors, maraba virus vectors and group B adenovirus enadenotucirev vectors.

a. Viral Vectors

Viral vectors encoding an antigen receptor may be provided in certain aspects of the present disclosure. In generating recombinant viral vectors, non-essential genes are typically replaced with a gene or coding sequence for a heterologous (or non-native) protein. A viral vector is a kind of expression construct that utilizes viral sequences to introduce nucleic acid and possibly proteins into a cell. The ability of certain viruses to infect cells or enter cells via receptor mediated-endocytosis, and to integrate into host cell genomes and express viral genes stably and efficiently have made them attractive candidates for the transfer of foreign nucleic acids into cells (e.g., mammalian cells). Non-limiting examples of virus vectors that may be used to deliver a nucleic acid of certain aspects of the present invention are described below.

Lentiviruses are complex retroviruses, which, in addition to the common retroviral genes gag, pol, and env, contain other genes with regulatory or structural function. Lentiviral vectors are well known in the art (see, for example, U.S. Pat. Nos. 6,013,516 and 5,994,136).

Recombinant lentiviral vectors are capable of infecting non-dividing cells and can be used for both in vivo and ex vivo gene transfer and expression of nucleic acid sequences. For example, recombinant lentivirus capable of infecting a non-dividing cell—wherein a suitable host cell is transfected with two or more vectors carrying the packaging functions, namely gag, pol and env, as well as rev and tat—is described in U.S. Pat. No. 5,994,136, incorporated herein by reference.

b. Regulatory Elements

Expression cassettes included in vectors useful in the present disclosure in particular contain (in a 5'-to-3' direction) a eukaryotic transcriptional promoter operably linked to a protein-coding sequence, splice signals including intervening sequences, and a transcriptional termination/polyadenylation sequence. The promoters and enhancers that control the transcription of protein encoding genes in eukaryotic cells are composed of multiple genetic elements. The cellular machinery is able to gather and integrate the regulatory information conveyed by each element, allowing different genes to evolve distinct, often complex patterns of transcriptional regulation. A promoter used in the context of the present disclosure includes constitutive, inducible, and tissue-specific promoters.

(i) Promoter/Enhancers

The expression constructs provided herein comprise a promoter to drive expression of the antigen receptor. A promoter generally comprises a sequence that functions to position the start site for RNA synthesis. The best known example of this is the TATA box, but in some promoters lacking a TATA box, such as, for example, the promoter for the mammalian terminal deoxynucleotidyl transferase gene and the promoter for the SV40 late genes, a discrete element overlying the start site itself helps to fix the place of initiation. Additional promoter elements regulate the frequency of transcriptional initiation. Typically, these are located in the region 30110 bp-upstream of the start site, although a number of promoters have been shown to contain functional elements downstream of the start site as well. To bring a coding sequence "under the control of" a promoter, one positions the 5' end of the transcription initiation site of the transcriptional reading frame "downstream" of (i.e., 3' of) the chosen promoter. The "upstream" promoter stimulates transcription of the DNA and promotes expression of the encoded RNA.

The spacing between promoter elements frequently is flexible, so that promoter function is preserved when elements are inverted or moved relative to one another. In the tk promoter, the spacing between promoter elements can be increased to 50 bp apart before activity begins to decline. Depending on the promoter, it appears that individual elements can function either cooperatively or independently to activate transcription. A promoter may or may not be used in conjunction with an "enhancer," which refers to a cis-acting regulatory sequence involved in the transcriptional activation of a nucleic acid sequence.

A promoter may be one naturally associated with a nucleic acid sequence, as may be obtained by isolating the 5' non-coding sequences located upstream of the coding segment and/or exon. Such a promoter can be referred to as "endogenous." Similarly, an enhancer may be one naturally associated with a nucleic acid sequence, located either downstream or upstream of that sequence. Alternatively, certain advantages will be gained by positioning the coding nucleic acid segment under the control of a recombinant or heterologous promoter, which refers to a promoter that is not normally associated with a nucleic acid sequence in its natural environment. A recombinant or heterologous enhancer refers also to an enhancer not normally associated with a nucleic acid sequence in its natural environment. Such promoters or enhancers may include promoters or enhancers of other genes, and promoters or enhancers isolated from any other virus, or prokaryotic or eukaryotic cell, and promoters or enhancers not "naturally occurring," i.e., containing different elements of different transcriptional regulatory regions, and/or mutations that alter expression. For example, promoters that are most commonly used in recombinant DNA construction include the Plactamase (penicillinase), lactose and tryptophan (trp-) promoter systems. In addition to producing nucleic acid sequences of promoters and enhancers synthetically, sequences may be produced using recombinant cloning and/or nucleic acid amplification technology, including PCR™, in connection with the compositions disclosed herein. Furthermore, it is contemplated that the control sequences that direct transcription and/or expression of sequences within non-nuclear organelles such as mitochondria, chloroplasts, and the like, can be employed as well.

Naturally, it will be important to employ a promoter and/or enhancer that effectively directs the expression of the DNA segment in the organelle, cell type, tissue, organ, or organism chosen for expression. Those of skill in the art of molecular biology generally know the use of promoters, enhancers, and cell type combinations for protein expression, (see, for example Sambrook et al. 1989, incorporated herein by reference). The promoters employed may be constitutive, tissue-specific, inducible, and/or useful under the appropriate conditions to direct high level expression of the introduced DNA segment, such as is advantageous in the large-scale production of recombinant proteins and/or peptides. The promoter may be heterologous or endogenous.

Additionally, any promoter/enhancer combination (as per, for example, the Eukaryotic Promoter Data Base EPDB, through world wide web at epd.isb-sib.ch/) could also be used to drive expression. Use of a T3, T7 or SP6 cytoplasmic expression system is another possible embodiment. Eukaryotic cells can support cytoplasmic transcription from certain bacterial promoters if the appropriate bacterial polymerase is provided, either as part of the delivery complex or as an additional genetic expression construct.

Non-limiting examples of promoters include early or late viral promoters, such as, SV40 early or late promoters, cytomegalovirus (CMV) immediate early promoters, Rous Sarcoma Virus (RSV) early promoters; eukaryotic cell promoters, such as, e.g., beta actin promoter, GADPH promoter, metallothionein promoter; and concatenated response element promoters, such as cyclic AMP response element promoters (cre), serum response element promoter (sre), phorbol ester promoter (TPA) and response element promoters (tre) near a minimal TATA box. It is also possible to use human growth hormone promoter sequences (e.g., the human growth hormone minimal promoter described at Genbank, accession no. X05244, nucleotide 283-341) or a mouse mammary tumor promoter (available from the ATCC, Cat. No. ATCC 45007). In certain embodiments, the promoter is CMV IE, dectin-1, dectin-2, human CD11c, F4/80, SM22, RSV, SV40, Ad MLP, beta-actin, MHC class I or MHC class II promoter, however any other promoter that is useful to drive expression of the therapeutic gene is applicable to the practice of the present disclosure.

In certain aspects, methods of the disclosure also concern enhancer sequences, i.e., nucleic acid sequences that increase a promoter's activity and that have the potential to act in cis, and regardless of their orientation, even over relatively long distances (up to several kilobases away from the target promoter). However, enhancer function is not necessarily restricted to such long distances as they may also function in close proximity to a given promoter.

(ii) Initiation Signals and Linked Expression

A specific initiation signal also may be used in the expression constructs provided in the present disclosure for efficient translation of coding sequences. These signals include the ATG initiation codon or adjacent sequences. Exogenous translational control signals, including the ATG initiation codon, may need to be provided. One of ordinary skill in the art would readily be capable of determining this and providing the necessary signals. It is well known that the initiation codon must be "in-frame" with the reading frame of the desired coding sequence to ensure translation of the entire insert. The exogenous translational control signals and initiation codons can be either natural or synthetic. The efficiency of expression may be enhanced by the inclusion of appropriate transcription enhancer elements.

In certain embodiments, the use of internal ribosome entry sites (IRES) elements are used to create multigene, or polycistronic, messages. IRES elements are able to bypass the ribosome scanning model of 5' methylated Cap dependent translation and begin translation at internal sites. IRES elements from two members of the picornavirus family (polio and encephalomyocarditis) have been described, as well an IRES from a mammalian message. IRES elements can be linked to heterologous open reading frames. Multiple open reading frames can be transcribed together, each separated by an IRES, creating polycistronic messages. By virtue of the IRES element, each open reading frame is accessible to ribosomes for efficient translation. Multiple genes can be efficiently expressed using a single promoter/enhancer to transcribe a single message.

Additionally, certain 2A sequence elements could be used to create linked- or co-expression of genes in the constructs provided in the present disclosure. For example, cleavage sequences could be used to co-express genes by linking open reading frames to form a single cistron. An exemplary cleavage sequence is the F2A (Foot-and-mouth disease virus 2A) or a "2A-like" sequence (e.g., *Thosea asigna* virus 2A; T2A).

(iii) Origins of Replication

In order to propagate a vector in a host cell, it may contain one or more origins of replication sites (often termed "ori"), for example, a nucleic acid sequence corresponding to oriP of EBV as described above or a genetically engineered oriP with a similar or elevated function in programming, which is a specific nucleic acid sequence at which replication is initiated. Alternatively a replication origin of other extra-chromosomally replicating virus as described above or an autonomously replicating sequence (ARS) can be employed.

c. Selection and Screenable Markers

In some embodiments, cells containing a construct of the present disclosure may be identified in vitro or in vivo by including a marker in the expression vector. Such markers would confer an identifiable change to the cell permitting easy identification of cells containing the expression vector. Generally, a selection marker is one that confers a property that allows for selection. A positive selection marker is one in which the presence of the marker allows for its selection, while a negative selection marker is one in which its presence prevents its selection. An example of a positive selection marker is a drug resistance marker.

Usually the inclusion of a drug selection marker aids in the cloning and identification of transformants, for example, genes that confer resistance to neomycin, puromycin, hygromycin, DHFR, GPT, zeocin and histidinol are useful selection markers. In addition to markers conferring a phenotype that allows for the discrimination of transformants based on the implementation of conditions, other types of markers including screenable markers such as GFP, whose basis is colorimetric analysis, are also contemplated. Alternatively, screenable enzymes as negative selection markers such as herpes simplex virus thymidine kinase (tk) or chloramphenicol acetyltransferase (CAT) may be utilized. One of skill in the art would also know how to employ immunologic markers, possibly in conjunction with FACS analysis. The marker used is not believed to be important, so long as it is capable of being expressed simultaneously with the nucleic acid encoding a gene product. Further examples of selection and screenable markers are well known to one of skill in the art.

d. Other Methods of Nucleic Acid Delivery

In addition to viral delivery of the nucleic acids encoding the antigen receptor, the following are additional methods of recombinant gene delivery to a given host cell and are thus considered in the present disclosure.

Introduction of a nucleic acid, such as DNA or RNA, into the immune cells of the current disclosure may use any suitable methods for nucleic acid delivery for transformation of a cell, as described herein or as would be known to one of ordinary skill in the art. Such methods include, but are not limited to, direct delivery of DNA such as by ex vivo transfection, by injection, including microinjection); by electroporation; by calcium phosphate precipitation; by using DEAE-dextran followed by polyethylene glycol; by direct sonic loading; by liposome mediated transfection and receptor-mediated transfection; by microprojectile bombardment; by agitation with silicon carbide fibers; by *Agrobacterium*-mediated transformation; by desiccation/inhibition-mediated DNA uptake, and any combination of such methods. Through the application of techniques such as these, organelle(s), cell(s), tissue(s) or organism(s) may be stably or transiently transformed.

D. Chimeric Antigen Receptors (CARs) and Engineered TCRs

The Bregs may be genetically engineered to express antigen receptors such as engineered TCRs and/or chimeric antigen receptors (CARs). For example, the B cells may be modified to express a cell receptor having antigenic specificity for a cancer antigen. Multiple CARs and/or multiple engineered TCRs, such as to different antigens, may be added to the B cells.

In some embodiments, the CAR comprises an extracellular antigen-recognition domain that specifically binds to an antigen. In some embodiments, the antigen is a protein expressed on the surface of cells. In some embodiments, the CAR is a TCR-like CAR and the antigen is a processed peptide antigen, such as a peptide antigen of an intracellular protein, which, like a TCR, is recognized on the cell surface in the context of a major histocompatibility complex (MHC) molecule.

In some embodiments, the chimeric antigen receptor comprises: a) an intracellular signaling domain, b) a transmembrane domain, and c) an extracellular domain comprising an antigen binding region.

In some embodiments, the engineered antigen receptors include CARs, including activating or stimulatory CARs, costimulatory CARs (see WO 2014/055668), and/or inhibitory CARs (iCARs, see Fedorov et al., 2013). The CARs generally include an extracellular antigen (or ligand) binding domain linked to one or more intracellular signaling components, in some aspects via linkers and/or transmembrane domain(s). Such molecules typically mimic or approximate a signal through a natural antigen receptor, a signal through such a receptor in combination with a costimulatory receptor, and/or a signal through a costimulatory receptor alone.

Certain embodiments of the present disclosure concern the use of nucleic acids, including nucleic acids encoding an antigen-specific chimeric antigen receptor (CAR) polypeptide, including a CAR that has been humanized to reduce immunogenicity (hCAR), comprising an intracellular signaling domain, a transmembrane domain, and an extracellular domain comprising one or more signaling motifs. In certain embodiments, the CAR may recognize an epitope comprising the shared space between one or more antigens. In certain embodiments, the binding region can comprise complementary determining regions of a monoclonal antibody, variable regions of a monoclonal antibody, and/or antigen binding fragments thereof. In another embodiment, that specificity is derived from a peptide (e.g., cytokine) that binds to a receptor.

It is contemplated that the human CAR nucleic acids may be human genes used to enhance cellular immunotherapy for human patients. In a specific embodiment, the invention includes a full-length CAR cDNA or coding region. The antigen binding regions or domain can comprise a fragment of the $V_H$ and $V_L$ chains of a single-chain variable fragment (scFv) derived from a particular human monoclonal antibody, such as those described in U.S. Pat. No. 7,109,304, incorporated herein by reference. The fragment can also be any number of different antigen binding domains of a human antigen-specific antibody. In a more specific embodiment, the fragment is an antigen-specific scFv encoded by a sequence that is optimized for human codon usage for expression in human cells.

The arrangement could be multimeric, such as a diabody or multimers. The multimers are most likely formed by cross pairing of the variable portion of the light and heavy chains into a diabody. The hinge portion of the construct can have multiple alternatives from being totally deleted, to having the first cysteine maintained, to a proline rather than a serine substitution, to being truncated up to the first cysteine. The Fc portion can be deleted. Any protein that is stable and/or dimerizes can serve this purpose. One could use just one of the Fc domains, e.g., either the CH2 or CH3 domain from human immunoglobulin. One could also use the hinge, CH2 and CH3 region of a human immunoglobulin that has been modified to improve dimerization. One could also use just the hinge portion of an immunoglobulin. One could also use portions of CD8alpha.

In some embodiments, the CAR nucleic acid comprises a sequence encoding other costimulatory receptors, such as a transmembrane domain and a modified CD28 intracellular signaling domain. Other costimulatory receptors include, but are not limited to one or more of CD28, CD27, OX-40 (CD134), DAP10, and 4-1BB (CD137). In addition to a primary signal initiated by CD3ζ, an additional signal provided by a human costimulatory receptor inserted in a human CAR is important for full activation of NK cells and could help improve in vivo persistence and the therapeutic success of the adoptive immunotherapy.

In some embodiments, CAR is constructed with a specificity for a particular antigen (or marker or ligand), such as an antigen expressed in a particular cell type to be targeted by adoptive therapy, e.g., a cancer marker, and/or an antigen intended to induce a dampening response, such as an antigen expressed on a normal or non-diseased cell type. Thus, the CAR typically includes in its extracellular portion one or more antigen binding molecules, such as one or more antigen-binding fragment, domain, or portion, or one or more antibody variable domains, and/or antibody molecules. In some embodiments, the CAR includes an antigen-binding portion or portions of an antibody molecule, such as a single-chain antibody fragment (scFv) derived from the variable heavy (VH) and variable light (VL) chains of a monoclonal antibody (mAb).

In certain embodiments of the chimeric antigen receptor, the antigen-specific portion of the receptor (which may be referred to as an extracellular domain comprising an antigen binding region) comprises a tumor associated antigen or a pathogen-specific antigen binding domain. Antigens include carbohydrate antigens recognized by pattern-recognition receptors, such as Dectin-1. A tumor associated antigen may be of any kind so long as it is expressed on the cell surface of tumor cells. Exemplary embodiments of tumor associated antigens include CD19, CD20, carcinoembryonic antigen, alphafetoprotein, CA-125, MUC-1, CD56, EGFR, c-Met, AKT, Her2, Her3, epithelial tumor antigen, melanoma-associated antigen, mutated p53, mutated ras, and so forth. In certain embodiments, the CAR may be co-expressed with a cytokine to improve persistence when there is a low amount of tumor-associated antigen. For example, CAR may be co-expressed with IL-15.

The sequence of the open reading frame encoding the chimeric receptor can be obtained from a genomic DNA source, a cDNA source, or can be synthesized (e.g., via PCR), or combinations thereof. Depending upon the size of the genomic DNA and the number of introns, it may be desirable to use cDNA or a combination thereof as it is found that introns stabilize the mRNA. Also, it may be further advantageous to use endogenous or exogenous non-coding regions to stabilize the mRNA.

It is contemplated that the chimeric construct can be introduced into immune cells as naked DNA or in a suitable vector. Methods of stably transfecting cells by electroporation using naked DNA are known in the art. See, e.g., U.S. Pat. No. 6,410,319. Naked DNA generally refers to the DNA encoding a chimeric receptor contained in a plasmid expression vector in proper orientation for expression.

Alternatively, a viral vector (e.g., a retroviral vector, adenoviral vector, adeno-associated viral vector, or lentiviral vector) can be used to introduce the chimeric construct into immune cells. Suitable vectors for use in accordance with the method of the present disclosure are non-replicating in the immune cells. A large number of vectors are known that are based on viruses, where the copy number of the virus maintained in the cell is low enough to maintain the viability of the cell, such as, for example, vectors based on HIV, SV40, EBV, HSV, or BPV.

In some aspects, the antigen-specific binding, or recognition component is linked to one or more transmembrane and intracellular signaling domains. In some embodiments, the CAR includes a transmembrane domain fused to the extracellular domain of the CAR. In one embodiment, the transmembrane domain that naturally is associated with one of the domains in the CAR is used. In some instances, the transmembrane domain is selected or modified by amino acid substitution to avoid binding of such domains to the transmembrane domains of the same or different surface membrane proteins to minimize interactions with other members of the receptor complex.

The transmembrane domain in some embodiments is derived either from a natural or from a synthetic source. Where the source is natural, the domain in some aspects is derived from any membrane-bound or transmembrane protein. Transmembrane regions include those derived from (i.e. comprise at least the transmembrane region(s) of) the alpha, beta or zeta chain of the T-cell receptor, CD28, CD3 zeta, CD3 epsilon, CD3 gamma, CD3 delta, CD45, CD4, CD5, CD8, CD9, CD 16, CD22, CD33, CD37, CD64, CD80, CD86, CD 134, CD137, CD154, ICOS/CD278, GITR/CD357, NKG2D, and DAP molecules. Alternatively, the transmembrane domain in some embodiments is synthetic. In some aspects, the synthetic transmembrane domain comprises predominantly hydrophobic residues such as leucine and valine. In some aspects, a triplet of phenylalanine, tryptophan and valine will be found at each end of a synthetic transmembrane domain.

In certain embodiments, the platform technologies disclosed herein to genetically modify immune cells comprise (i) non-viral gene transfer using an electroporation device (e.g., a nucleofector), (ii) CARs that signal through endodomains (e.g., CD28/CD3-ζ, CD137/CD3-ζ, or other combinations), (iii) CARs with variable lengths of extracellular domains connecting the antigen-recognition domain to the cell surface, and, in some cases, (iv) artificial antigen presenting cells (aAPC) derived from K562 to be able to robustly and numerically expand CAR+ immune cells.

2. Suicide Genes

The CAR and/or TCR of the T cells of the present disclosure may comprise one or more suicide genes. The term "suicide gene" as used herein is defined as a gene which may be used to selectively target cells for killing. For example, as suicide gene may, upon administration of a prodrug, effect transition of a gene product to a compound which kills its host cell. Examples of suicide gene/prodrug combinations which may be used are Herpes Simplex Virus-thymidine kinase (HSV-tk) and ganciclovir, acyclovir, or FIAU; oxidoreductase and cycloheximide; cytosine deaminase and 5-fluorocytosine; thymidine kinase thymidilate kinase (Tdk::Tmk) and AZT; and deoxycytidine kinase and cytosine arabinoside.

The *E. coli* purine nucleoside phosphorylase, a so-called suicide gene which converts the prodrug 6-methylpurine deoxyriboside to toxic purine 6-methylpurine. Other examples of suicide genes used with prodrug therapy are the *E. coli* cytosine deaminase gene and the HSV thymidine kinase gene.

Exemplary suicide genes include CD20, CD52, EGFRv3, or inducible caspase 9. In one embodiment, a truncated version of EGFR variant III (EGFRv3) may be used as a suicide antigen which can be ablated by Cetuximab. Further suicide genes known in the art that may be used in the present disclosure include Purine nucleoside phosphorylase (PNP), Cytochrome p450 enzymes (CYP), Carboxypeptidases (CP), Carboxylesterase (CE), Nitroreductase (NTR), Guanine Ribosyltransferase (XGRTP), Glycosidase enzymes, Methionine-α,γ-lyase (MET), and Thymidine phosphorylase (TP).

3. Modification of Gene Expression

In some embodiments, the cells of the present disclosure are modified to have altered expression of certain genes such as glucocorticoid receptor, TGFβ receptor (e.g., TGFβ-RII), and/or CISH. In one embodiment, the cells may be modified to express a dominant negative TGFβ receptor II (TGFβRIIDN) which can function as a cytokine sink to deplete endogenous TGFβ.

In some embodiments, the altered gene expression is carried out by effecting a disruption in the gene, such as a knock-out, insertion, missense or frameshift mutation, such as biallelic frameshift mutation, deletion of all or part of the gene, e.g., one or more exon or portion therefore, and/or knock-in. For example, the altered gene expression can be effected by sequence-specific or targeted nucleases, including DNA-binding targeted nucleases such as zinc finger nucleases (ZFN) and transcription activator-like effector nucleases (TALENs), and RNA-guided nucleases such as a CRISPR-associated nuclease (Cas), specifically designed to be targeted to the sequence of the gene or a portion thereof.

III. METHODS OF USE

Certain embodiments of the present disclosure concern methods for the use of the Breg populations provided herein for treating or preventing an inflammatory or immune-mediated disorder. The method includes administering to the subject a therapeutically effective amount of the Bregs, thereby treating or preventing the inflammatory or immune-mediated disorder in the subject.

The Bregs generated according to the present methods have many potential uses, including experimental and therapeutic uses. In particular, it is envisaged that such cell populations will be extremely useful in suppressing undesirable or inappropriate immune responses. In such methods, a small number of B cells are removed from a patient and then manipulated and expanded ex vivo before reinfusing them into the individual in need thereof. Examples of diseases that may be treated in this way are autoimmune diseases and conditions in which suppressed immune activity is desirable, e.g., for allo-transplantation tolerance. A therapeutic method could comprise providing a mammal, obtaining B cells from the mammal; expanding the B cells ex vivo in accordance with the methods of the present methods as described above; and administering the expanded Bregs to the mammal to be treated.

In one embodiment, a subject suffering from an autoimmune disease or an inflammatory disease (e.g., associated with diminished levels of IL-10) is administered a population of Bregs. In one aspect of this embodiment, the B cell and/or T cell population is isolated from the patient themselves, i.e., the subject is the donor. In another aspect of this embodiment, the B cell population is isolated from a donor that is not the subject. In an aspect of this embodiment, the B cell population is pooled from several donors, such as from the cord blood of several donors. According to this embodiment, administration of a regulatory B cell population to a subject in need thereof results in an increased level of IL-10 production in the patient sufficient to control, reduce, or eliminate symptoms of the disease being treated.

In some embodiments, the Breg population is contacted with an antigen specific to a disorder, such as an autoimmune disorder, prior to introducing them to a subject. For example, the regulatory cells may be exposed to an autoantigen such as insulin or GAD-65 prior to administration to a subject to prevent or treat diabetes.

In one embodiment, the subject has an autoimmune disease. Non-limiting examples of autoimmune diseases include: alopecia areata, ankylosing spondylitis, antiphospholipid syndrome, autoimmune Addison's disease, autoimmune diseases of the adrenal gland, autoimmune hemolytic anemia, autoimmune hepatitis, autoimmune oophoritis and orchitis, autoimmune thrombocytopenia, Behcet's disease, bullous pemphigoid, cardiomyopathy, celiac spate-dermatitis, chronic fatigue immune dysfunction syndrome (CFIDS), chronic inflammatory demyelinating polyneuropathy, Churg-Strauss syndrome, cicatrical pemphigoid, CREST syndrome, cold agglutinin disease, Crohn's disease, discoid lupus, essential mixed cryoglobulinemia, fibromyalgia-fibromyositis, glomerulonephritis, Graves' disease, Guillain-Barre, Hashimoto's thyroiditis, idiopathic pulmonary fibrosis, idiopathic thrombocytopenia purpura (ITP), IgA neuropathy, juvenile arthritis, lichen planus, lupus erthematosus, Meniere's disease, mixed connective tissue disease, multiple sclerosis, type 1 or immune-mediated diabetes mellitus, myasthenia gravis, nephrotic syndrome (such as minimal change disease, focal glomerulosclerosis, or membranous nephropathy), pemphigus vulgaris, pernicious anemia, polyarteritis nodosa, polychondritis, polyglandular syndromes, polymyalgia rheumatica, polymyositis and dermatomyositis, primary agammaglobulinemia, primary biliary cirrhosis, psoriasis, psoriatic arthritis, Raynaud's phenomenon, Reiter's syndrome, Rheumatoid arthritis, sarcoidosis, scleroderma, Sjogren's syndrome, stiff-man syndrome, systemic lupus erythematosus, lupus erythematosus, ulcerative colitis, uveitis, vasculitides (such as polyarteritis nodosa, takayasu arteritis, temporal arteritis/giant cell arteritis, or dermatitis herpetiformis vasculitis), vitiligo, and Wegener's granulomatosis. Thus, some examples of an autoimmune disease that can be treated using the methods disclosed herein include, but are not limited to, multiple sclerosis, rheumatoid arthritis, systemic lupus erythematosis, type I diabetes mellitus, Crohn's disease; ulcerative colitis, myasthenia gravis, glomerulonephritis, ankylosing spondylitis, vasculitis, and/or psoriasis. The subject can also have an allergic disorder such as Asthma.

In yet another embodiment, the subject is the recipient of a transplanted organ or stem cells, and expanded regulatory cells (e.g., Bregs) are used to prevent and/or treat rejection. In particular embodiments, the subject has or is at risk of developing graft versus host disease. GVHD is a possible complication of any transplant that uses or contains stem cells from either a related or an unrelated donor. There are two kinds of GVHD, acute and chronic. Acute GVHD appears within the first three months following transplantation. Signs of acute GVHD include a reddish skin rash on the hands and feet that may spread and become more severe, with peeling or blistering skin. Acute GVHD can also affect the stomach and intestines, in which case cramping, nausea, and diarrhea are present. Yellowing of the skin and eyes (jaundice) indicates that acute GVHD has affected the liver. Chronic GVHD is ranked based on its severity: stage/grade 1 is mild; stage/grade 4 is severe. Chronic GVHD develops three months or later following transplantation. The symptoms of chronic GVHD are similar to those of acute GVHD, but in addition, chronic GVHD may also affect the mucous glands in the eyes, salivary glands in the mouth, and glands that lubricate the stomach lining and intestines. Any of the populations of regulatory B cells disclosed herein can be utilized. Examples of a transplanted organ include a solid organ transplant, such as kidney, liver, skin, pancreas, lung and/or heart, or a cellular transplant such as islets, hepatocytes, myoblasts, bone marrow, or hematopoietic or other stem cells. The transplant can be a composite transplant, such as tissues of the face. Regulatory B cells, such as immunosuppressive $CD19^+$ cells, can be administered prior to transplantation, concurrently with transplantation, or following transplantation. In some embodiments, the regulatory B cells are administered prior to the transplant, such as at least 1 hour, at least 12 hours, at least 1 day, at least 2 days, at least 3 days, at least 4 days, at least 5 days, at least 6 days, at least 1 week, at least 2 weeks, at least 3 weeks, at least 4 weeks, or at least 1 month prior to the transplant. In one specific, non-limiting example, administration of the therapeutically effective amount of regulatory B cells occurs 3-5 days prior to transplantation.

A regulatory cell subset administered to a patient that is receiving a transplant can be sensitized with antigens specific to the transplanted material prior to administration. According to this embodiment, the transplant recipient will have a decreased immune/inflammatory response to the transplanted material and, as such, the likelihood of rejection of the transplanted tissue is minimized. Similarly, with regard to the treatment of graft versus host disease, the regulatory cell subset can be sensitized with antigens specific to the host. According to this embodiment, the recipient will have a decreased immune/inflammatory response to self-antigens.

In a further embodiment, administration of a therapeutically effective amount of regulatory cells (e.g., Bregs) to a subject treats or inhibits inflammation in the subject. Thus, the method includes administering a therapeutically effective amount of regulatory cells to the subject to inhibit the inflammatory process. Examples of inflammatory disorders include, but are not limited to, asthma, encephalitis, inflammatory bowel disease, chronic obstructive pulmonary disease (COPD), allergic disorders, septic shock, pulmonary fibrosis, undifferentiated spondyloarthropathy, undifferentiated arthropathy, arthritis, inflammatory osteolysis, and chronic inflammation resulting from chronic viral or bacterial infections. The methods disclosed herein can also be used to treat allergic disorders.

Administration of regulatory cells can be utilized whenever immunosuppression or inhibition of inflammation is desired, for example, at the first sign or symptoms of a disease or inflammation. These may be general, such as pain, edema, elevated temperature, or may be specific signs or symptoms related to dysfunction of affected organ(s). For example in renal transplant rejection there may be an elevated serum creatinine level, whereas in GVHD, there may be a rash, and in asthma, there may be shortness of breath and wheezing.

Administration of regulatory cells can also be utilized to prevent immune-mediated disease in a subject of interest. For example, regulatory cells can be administered to a subject that will be a transplant recipient prior to the transplantation. In another example, regulatory cells are administered to a subject receiving allogeneic bone marrow transplants without T cell depletion. In a further example, regulatory cells can be administered to a subject with a family history of diabetes. In other example, regulatory cells are administered to a subject with asthma in order to prevent an asthma attack. In some embodiments, a therapeutically effective amount of regulatory cells is administered to the subject in advance of a symptom. The administration of the regulatory cells results in decreased incidence or severity of subsequent immunological event or symptom (such as an asthma attack), or improved patient survival, compared to patients who received other therapy not including regulatory cells.

The effectiveness of treatment can be measured by many methods known to those of skill in the art. In one embodiment, a white blood cell count (WBC) is used to determine the responsiveness of a subject's immune system. A WBC measures the number of white blood cells in a subject. Using methods well known in the art, the white blood cells in a subject's blood sample are separated from other blood cells and counted. Normal values of white blood cells are about 4,500 to about 10,000 white blood cells/µl. Lower numbers of white blood cells can be indicative of a state of immunosuppression in the subject.

In another embodiment, immunosuppression in a subject may be determined using a T-lymphocyte count. Using methods well known in the art, the white blood cells in a subject's blood sample are separated from other blood cells. T-lymphocytes are differentiated from other white blood cells using standard methods in the art, such as, for example, immunofluorescence or FACS. Reduced numbers of T-cells, or a specific population of T-cells can be used as a measurement of immunosuppression. A reduction in the number of T-cells, or in a specific population of T-cells, compared to the number of T-cells (or the number of cells in the specific population) prior to treatment can be used to indicate that immunosuppression has been induced.

In additional embodiments, tests to measure T cell activation, proliferation, or cytokine responses including those to specific antigens are performed. In some examples, the number of Treg or Breg cells can be measured in a sample from a subject. In additional examples, cytokines are measured in a sample, from a subject, such as IL-10.

In other examples, to assess inflammation, neutrophil infiltration at the site of inflammation can be measured. In order to assess neutrophil infiltration myeloperoxidase activity can be measured. Myeloperoxidase is a hemoprotein present in azurophilic granules of polymorphonuclear leukocytes and monocytes. It catalyzes the oxidation of halide ions to their respective hypohalous acids, which are used for microbial killing by phagocytic cells. Thus, a decrease in myeloperoxidase activity in a tissue reflects decreased neutrophil infiltration, and can serve as a measure of inhibition of inflammation.

In another example, effective treatment of a subject can be assayed by measuring cytokine levels in the subject. Cytokine levels in body fluids or cell samples are determined by conventional methods. For example, an immunospot assay, such as the enzyme-linked immunospot or "ELISPOT" assay, can be used. The immunospot assay is a highly sensitive and quantitative assay for detecting cytokine secretion at the single cell level. Immunospot methods and applications are well known in the art and are described, for example, in EP 957359. Variations of the standard immunospot assay are well known in the art and can be used to detect alterations in cytokine production in the methods of the disclosure (see, for example, U.S. Pat. Nos. 5,939,281 and 6,218,132).

In another embodiment, administration of a therapeutically effective amount of stimulated regulatory B cells to a subject induces the production or activity of regulatory T cells, such as CD4$^+$CD25$^+$ of CD4+Foxp3+ suppressive T cells. In further embodiments, administration of a therapeutically effective amount of stimulated regulatory B cells decreases the proliferation of CD4$^+$ and/or CD8$^+$ T cells. In further embodiments, administration of a therapeutically effective amount of stimulated regulatory B cells reduces production of antibodies produced by the subject's non-regulatory B cells that are involved in the immune-mediated disease. In further embodiments, regulatory B cells may inhibit influx of inflammatory cells or damage mediated by innate immune cells. Thus, all of these cell types can be measured. In a further embodiment, cytokine production can be measured.

Suppression of proliferation can be evaluated using many methods well known in the art. In one embodiment, cell proliferation is quantified by measuring [$^3$H]-thymidine incorporation. Proliferating cells incorporate the labeled DNA precursor into newly synthesized DNA, such that the amount of incorporation, measured by liquid scintillation counting, is a relative measure of cellular proliferation. In another embodiment, cell proliferation is quantified using the thymidine analogue 5-bromo-2'-deoxyuridine (BrdU) in a proliferation assay. BrdU is incorporated into cellular DNA in a manner similar to thymidine, and is quantified using anti-BrdU mAbs by flow cytometry.

Therapeutically effective amounts of regulatory B cells can be administered by a number of routes, including parenteral administration, for example, intravenous, intraperitoneal, intramuscular, intrasternal, or intraarticular injection, or infusion.

The therapeutically effective amount of regulatory cells for use in inducing immunosuppression or treating or inhibiting inflammation is that amount that achieves a desired effect in a subject being treated. For instance, this can be the amount of regulatory cells necessary to inhibit advancement, or to cause regression of an autoimmune or alloimmune disease, or which is capable of relieving symptoms caused by an autoimmune disease, such as pain and inflammation. It can be the amount necessary to relieve symptoms associated with inflammation, such as pain, edema and elevated temperature. It can also be the amount necessary to diminish or prevent rejection of a transplanted organ.

The regulatory cell population can be administered in treatment regimens consistent with the disease, for example a single or a few doses over one to several days to ameliorate a disease state or periodic doses over an extended time to inhibit disease progression and prevent disease recurrence. The precise dose to be employed in the formulation will also depend on the route of administration, and the seriousness of the disease or disorder, and should be decided according to the judgment of the practitioner and each patient's circumstances. The therapeutically effective amount of regulatory cells will be dependent on the subject being treated, the severity and type of the affliction, and the manner of administration. In some embodiments, doses that could be used in the treatment of human subjects range from at least $3.8 \times 10^4$, at least $3.8 \times 10^5$, at least $3.8 \times 10^6$, at least $3.8 \times 10^7$, at least $3.8 \times 10^8$, at least $3.8 \times 10^9$, or at least $3.8 \times 10^{10}$ regulatory cells/m$^2$. In a certain embodiment, the dose used in the treatment of human subjects ranges from about $3.8 \times 10^9$ to about $3.8 \times 10^{10}$ regulatory cells/m$^2$. In additional embodiments, a therapeutically effective amount of regulatory cells can vary from about $5 \times 10^6$ cells per kg body weight to about $7.5 \times 10^8$ cells per kg body weight, such as about $2 \times 10^7$ cells to about $5 \times 10^8$ cells per kg body weight, or about $5 \times 10^7$ cells to about $2 \times 10^8$ cells per kg body weight. The exact amount of regulatory cells is readily determined by one of skill in the art based on the age, weight, sex, and physiological condition of the subject. Effective doses can be extrapolated from dose-response curves derived from in vitro or animal model test systems.

The expanded regulatory B cells may be administered in combination with one or more other therapeutic agents for the treatment of the immune-mediated disorder. Combination therapies can include, but are not limited to, one or more anti-microbial agents (for example, antibiotics, anti-viral agents and anti-fungal agents), anti-tumor agents (for example, fluorouracil, methotrexate, paclitaxel, fludarabine, etoposide, doxorubicin, or vincristine), immune-depleting agents (for example, fludarabine, etoposide, doxorubicin, or vincristine), immunosuppressive agents (for example, azathioprine, or glucocorticoids, such as dexamethasone or prednisone), anti-inflammatory agents (for example, glucocorticoids such as hydrocortisone, dexamethasone or prednisone, or non-steroidal anti-inflammatory agents such as acetylsalicylic acid, ibuprofen or naproxen sodium), cytokines (for example, interleukin-10 or transforming growth factor-beta), hormones (for example, estrogen), or a vaccine. In addition, immunosuppressive or tolerogenic agents including but not limited to calcineurin inhibitors (e.g. cyclosporin and tacrolimus); mTOR inhibitors (e.g. Rapamycin); mycophenolate mofetil, antibodies (e.g. recognizing CD3, CD4, CD40, CD154, CD45, IVIG, or B cells); chemotherapeutic agents (e.g. Methotrexate, Treosulfan, Busulfan); irradiation; or chemokines, interleukins or their inhibitors (e.g. BAFF, IL-2, anti-IL-2R, IL-4, JAK kinase inhibitors) can be administered. Such additional pharmaceutical agents can be administered before, during, or after administration of the regulatory B cells, depending on the desired effect. This administration of the cells and the agent can be by the same route or by different routes, and either at the same site or at a different site.

IV. KITS

In some embodiments, a kit that can include, for example, one or more media and components for the production of regulatory immune cells is provided. Such formulations may comprise a cocktail of factors, in a form suitable for combining with B cells. The reagent system may be packaged either in aqueous media or in lyophilized form, where appropriate. The container means of the kits will generally include at least one vial, test tube, flask, bottle, syringe or other container means, into which a component may be placed, and preferably, suitably aliquoted. Where there is more than one component in the kit, the kit also will generally contain a second, third or other additional container into which the additional components may be separately placed. However, various combinations of components may be comprised in a vial. The components of the kit may be provided as dried powder(s). When reagents and/or components are provided as a dry powder, the powder can be reconstituted by the addition of a suitable solvent. It is envisioned that the solvent may also be provided in another container means. The kits also will typically include a means for containing the kit component(s) in close confinement for commercial sale. Such containers may include injection or blow molded plastic containers into which the desired vials are retained. The kit can also include instructions for use, such as in printed or electronic format, such as digital format.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Expansion of Regulatory B Cells

For expansion, B cells were isolated from cord or peripheral blood using B cell isolation kit from Miltenyi (130-091-151). The purity of B cells was analyzed by flow cytometry to confirm more than 90% B cells. The B cells were activated with CpG ODN 2006 (CpG) (3 µg/ml, Hycult Biotech), anti-IgM+IgG (10 µg/ml, Jackson Immunoresearch), and IL-2 (100 IU/ml, peprotech) for 40-48 hours. The B cells were then transduced with MMLV retrovirus (LTR-hCD40L-2A-hIL21-LTR) along with further exogenous support with IL2 (50 IU/ml) and IL4 (4 ng/ml) (FIG. 1). The transduction efficiency was characterized at day 2-3 after transduction.

Functional studies were performed on Day 7-14 depending on the cell number and viability. Magnetically isolated CD4$^+$ T cells were stained with 2 µM carboxyfluorescein succinimidyl ester (CFSE) (eBioscience) prior to culture. Magnetically isolated CD4$^+$ T cells were plated in 96-well flat-bottom plates at 105 cells/well and stimulated with or without anti-CD3/CD28 Dynabeads (positive and negative controls, respectively). About 10$^5$ hCD40L/hIL21-transduced B cells were added at 1:1 or 1:2 ratio. B cells and CFSE-labelled CD4$^+$ T cells were cocultured for 48 hours. Phorbol myristate acetate (50 ng/ml)/ionomycin (500 ng/ml) (PMA/Iono) and brefeldin A (BFA) (10 µg/ml) (all from Sigma-Aldrich, St Louis, MO, USA) were added for the last 4 hrs. Cells were harvested, and intracellularly stained with anti-IFNγ (B27; BD) and TNFα (MAb11; Invitrogen). The proliferation of CD4$^+$ T cells was analyzed by calculating the division index. Culture in the presence of CD40L/hIL21-transduced B cells suppressed CD4$^+$ T cell proliferation as assessed by CFSE dilution at different T:B cell ratios (FIG. 2).

B cells were isolated from PBMCs, activated with CpG ODN 2006 (CpG) and CD40L for 48 hours and then transduced with viral supernatant that can overexpress CD40L and IL21. FIG. 4A demonstrates transduction efficiency. Absolute B cell number increased over time (FIG. 4B).

Figure 5A:
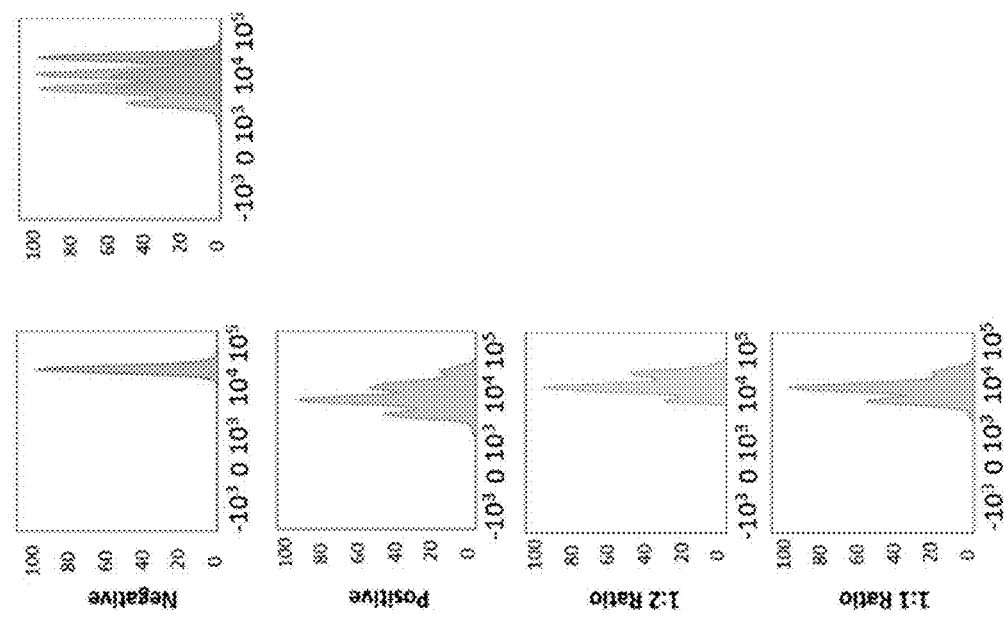
FIGS. 5A-5C: Magnetically isolated $CD4^+$ T cells were plated in 96-well flat-bottom plates at $10^5$ cells/well with $10^5$ activated or resting B cells and anti-CD3/CD28 Dynabeads (1:1 and 1:2 ratio; InvitroGen). $CD4^+$ T cells were stained with 2 µM carboxyfluorescein succinimidyl ester (CFSE) (eBioscience) prior to culture. (5A) B cells and CFSE-labelled $CD4^+$ T cells were cocultured as described in coculture experiment section for 48 hours. Phorbol myristate acetate (50 ng/ml)/ionomycin (500 ng/ml) (PMA/Iono) and brefeldin A (BFA) (10 µg/ml) (all from Sigma-Aldrich, St Louis, MO, USA) were added for the last 4 hr.Cells were harvested, and intracellularly stained with anti-IFN-γ (B27; BD), TNF-α (MAb11; invitrogen). (5B) The proliferation of CD4+ T cells was analyzed by calculating the division index. (5C) Combine 2 different experiment results for cytotoxicity assay. Bars from left to right are negative control, positive control, B+T-1:2 ratio; and B+T-1:1 ratio.
Figure 5B:
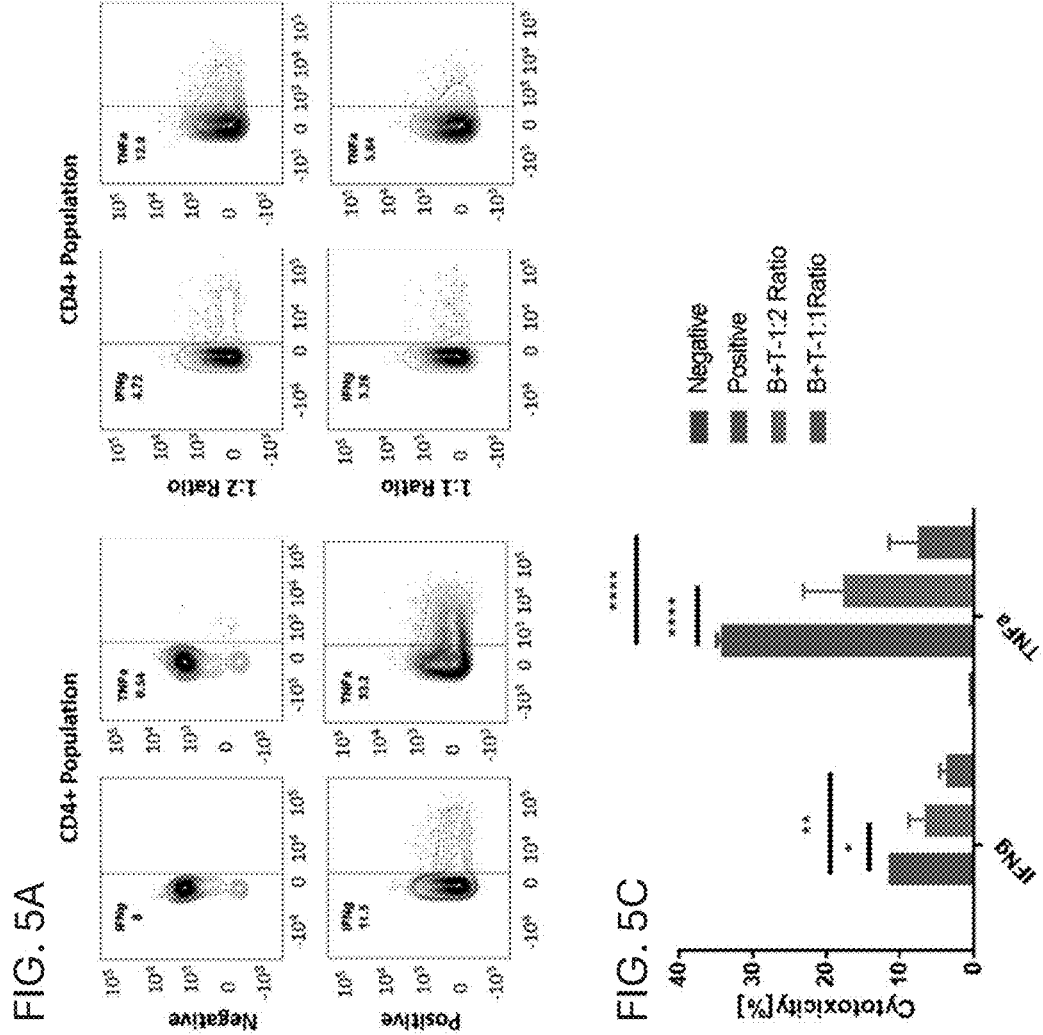
Figure 5C:
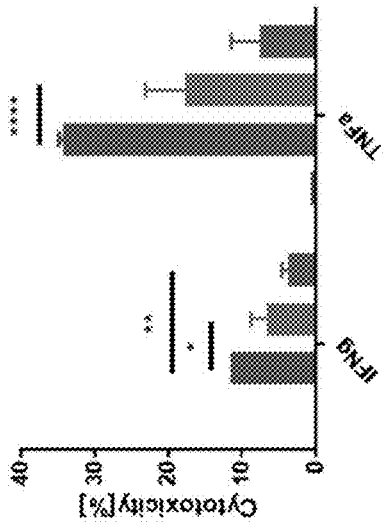

CD4+ T cells were isolated and plated in 96-well flat-bottom plates with 105 activated or resting B cells and anti-CD3/CD28 Dynabeads (FIG. 5A) B cells and CFSE-labelled CD4+ T cells were cocultured for 48 hours, and certain factors (Phorbol myristate acetate; ionomycin; and brefeldin A were added in the culture for the last 4 hr. Cells were harvested, and intracellularly stained with anti-IFN-γ (B27; BD), TNF-α (MAb11; invitrogen) (see FIG. 5B). FIG. 5C shows results of a cytotoxicity assay.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Cohen et al., *J Immunol.* 175:5799-5808, 2005.
Current Protocols in Immunology, Ed Coligan et al, Wiley, 1994.
Czerkinsky et al., *J. Immunol. Methods,* 110:29-36, 1988.
EP 957359
Fast et al., *Transfusion* 44:282-5, 2004.

Fedorov et al., *Sci. Transl. Medicine,* 5(215), 2013.
He Y, et al. *Journal of immunology* research, 7, 2014.
Heemskerk et al. *Hum Gene Ther.* 19:496-510, 2008.
International Patent Publication No. WO2000/06588
International Patent Publication No. WO2000/06588
International Publication No. PCT/US95/01570
International Publication No. WO2000/06588
International Publication No. WO2005/035570
Janeway et al, Immunobiology: The Immune System in Health and Disease, 3rd Ed., Current Biology Publications, p. 433, 1997.
Johnson et al. *Blood* 114:535-46, 2009.
Lefranc et al., *Dev. Comp. Immunol.* 27:55, 2003.
Li, *Nat Biotechnol.* 23:349-354, 2005.
Olsson et al. *J. Clin. Invest.* 86:981-985, 1990.
Parkhurst et al., *Clin Cancer Res.* 15: 169-180, 2009.
PCT Patent Publication No. WO2001/083517
Taitano et al., *The Journal of Immunology,* 196, 2016.
U.S. Pat. No. 7,109,304
U.S. Pat. No. 5,939,281
U.S. Pat. No. 5,939,281
U.S. Pat. No. 6,218,132
U.S. Pat. No. 6,218,132
U.S. Pat. No. 6,264,951
U.S. Pat. No. 6,426,331
U.S. Pat. No. 7,488,490
U.S. Pat. No. 7,488,490
U.S. Patent Publication No. 2007/0078113
Varela-Rohena et al., *Nat Med.* 14: 1390-1395, 2008.
WO2014/055668
Wong et al., *Cytotherapy,* 4: 65-76, 2002.

What is claimed is:

1. A method of activating and expanding isolated B cells, comprising exposing isolated B cells to IL-4, IL-21, CpG oligodeoxynucleotides, CD40L, anti-miR155, and one or more FOXO1 inhibitors.

2. The method of claim 1, wherein the B cells are further exposed to IL-33, anti-IgM, anti-IgG, or a combination thereof.

3. The method of claim 1, further comprising the step of engineering the B cells to express CD40L, BAFF, and/or IL-12 from a retroviral vector.

4. The method of claim 1, wherein the B cells are isolated from peripheral blood and/or cord blood.

5. The method of claim 1, wherein the B cells are further exposed to IL-2.

* * * * *